(12) United States Patent
Bricaud et al.

(10) Patent No.: US 6,354,881 B1
(45) Date of Patent: Mar. 12, 2002

(54) SMART CARD CONNECTOR WITH LANDING CONTACTS

(75) Inventors: Herve' Guy Bricaud; Fabrice Valcher, both of Dole (FR)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/438,683

(22) Filed: Nov. 12, 1999

Related U.S. Application Data

(63) Continuation-in-part of application No. PCT/FR98/00934, filed on May 11, 1998.

(30) Foreign Application Priority Data

May 13, 1997 (FR) ............................................ 97 05810

(51) Int. Cl.[7] .............................................. H01R 24/00
(52) U.S. Cl. ...................... 439/630; 439/188; 439/260; 439/267; 235/475; 235/479
(58) Field of Search ................................. 439/630, 260, 439/188, 60, 924.1, 267, 326; 225/441, 492, 475

(56) References Cited

U.S. PATENT DOCUMENTS

| | | | | |
|---|---|---|---|---|
| 4,874,323 A | * | 10/1989 | Shibano ....................... | 439/260 |
| 5,012,078 A | * | 4/1991 | Pernet ......................... | 439/260 |
| 5,640,307 A | * | 6/1997 | Bleier et al. ................. | 439/188 |
| 6,015,311 A | * | 1/2000 | Benjamin et al. ............ | 439/188 |
| 6,021,945 A | * | 2/2000 | Hoolhorst .................... | 235/441 |
| 6,102,723 A | * | 8/2000 | Kusakabe et al. ........... | 439/260 |

* cited by examiner

Primary Examiner—Tho D. Ta
(74) Attorney, Agent, or Firm—Roger C. Turner

(57) ABSTRACT

A connector with a slot for receiving a smart card with contact pads, includes contacts that are held away from the card slot until the card becomes fully inserted, using a mechanism with a minimum number of easily formed parts. The mechanism includes a rocker (142) with a control part (144) that is pivotally mounted about a rocker axis (Y—Y) and that has a rear end forming a tab (186) that projects into the rear end of the card slot, to be deflected downwardly by the card reaching its fully inserted position. The control part also has a front end (174) that is coupled to the contacts to depress them until the card is fully inserted, whereupon the contacts are released to move up. The rocker, which is formed from a single piece of sheet metal, includes a pair of laterally-spaced fastening plates (150) that are fixed to the housing, and a pair of deflectable portions (148, 154) that can be resiliently deformed to permit the control part to pivot. The deflectable portions include torsion bars (148) that can be twisted about the rocker axis and that bias the control part towards the position where the rear end extends into the card slot. The front end of the control part is coupled to the contacts through a plastic molded lever (112) that is pivotally mounted about a second lateral axis (X—X) on the housing.

14 Claims, 23 Drawing Sheets

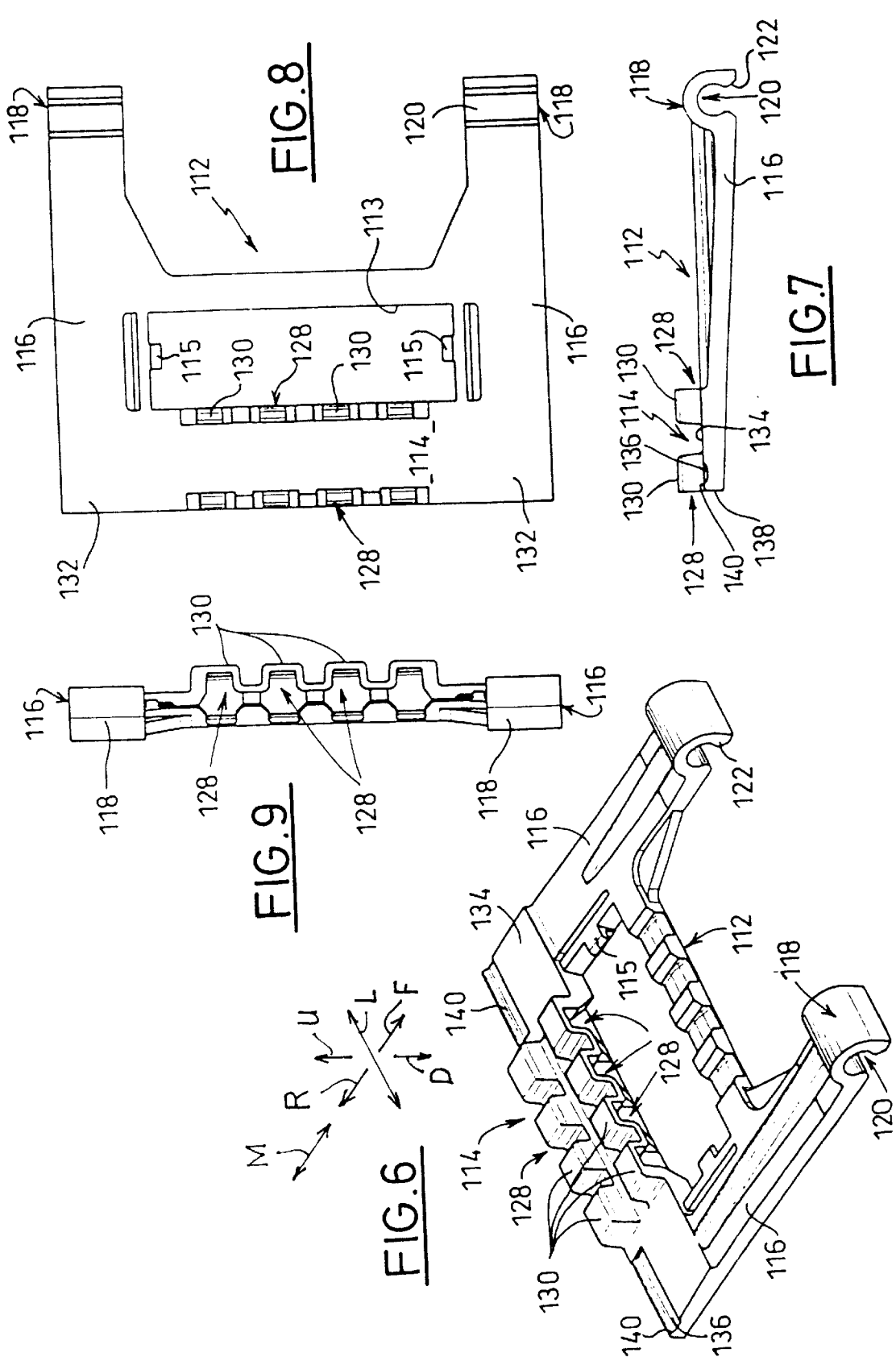

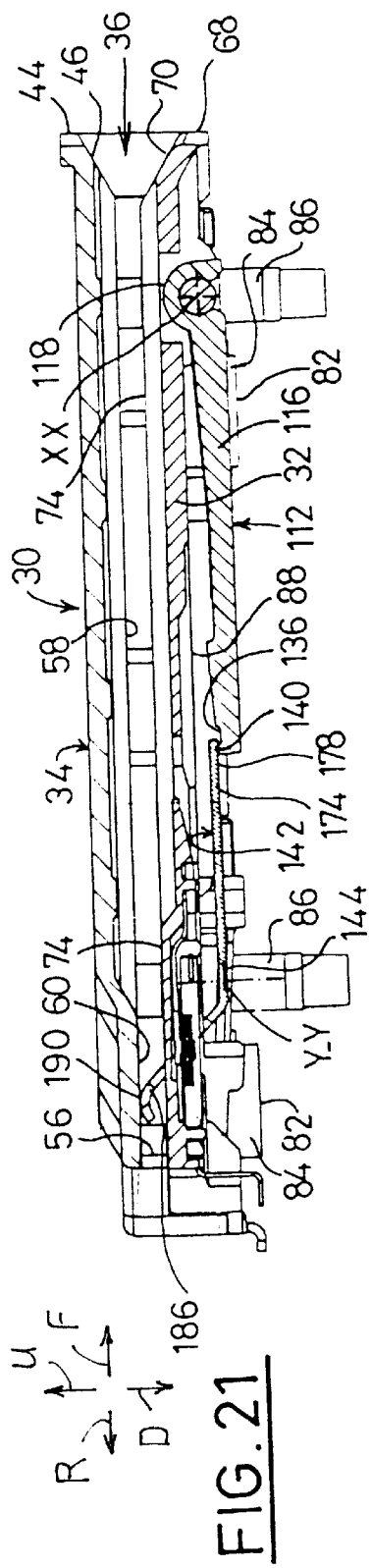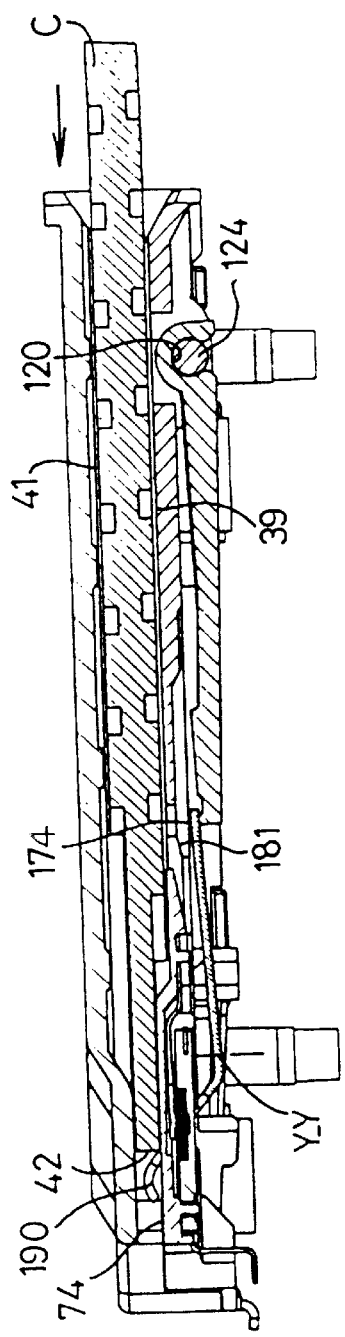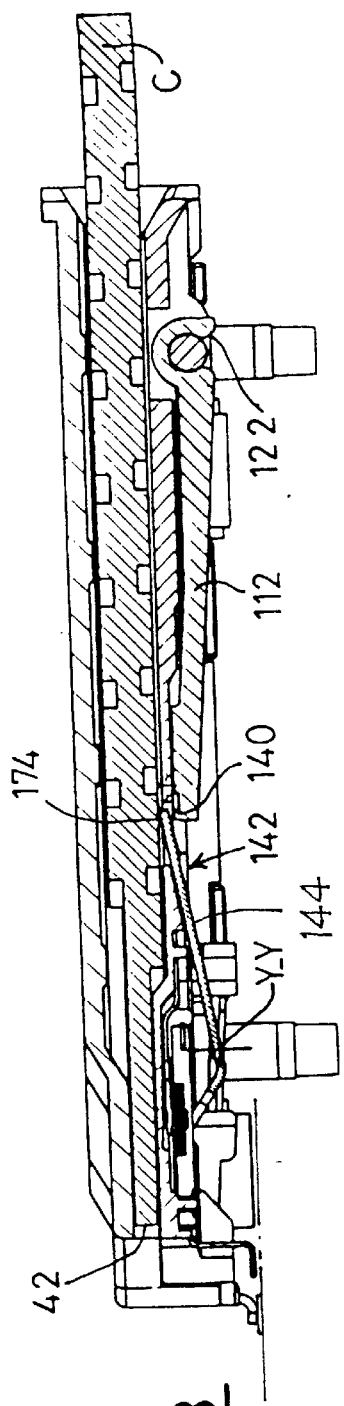

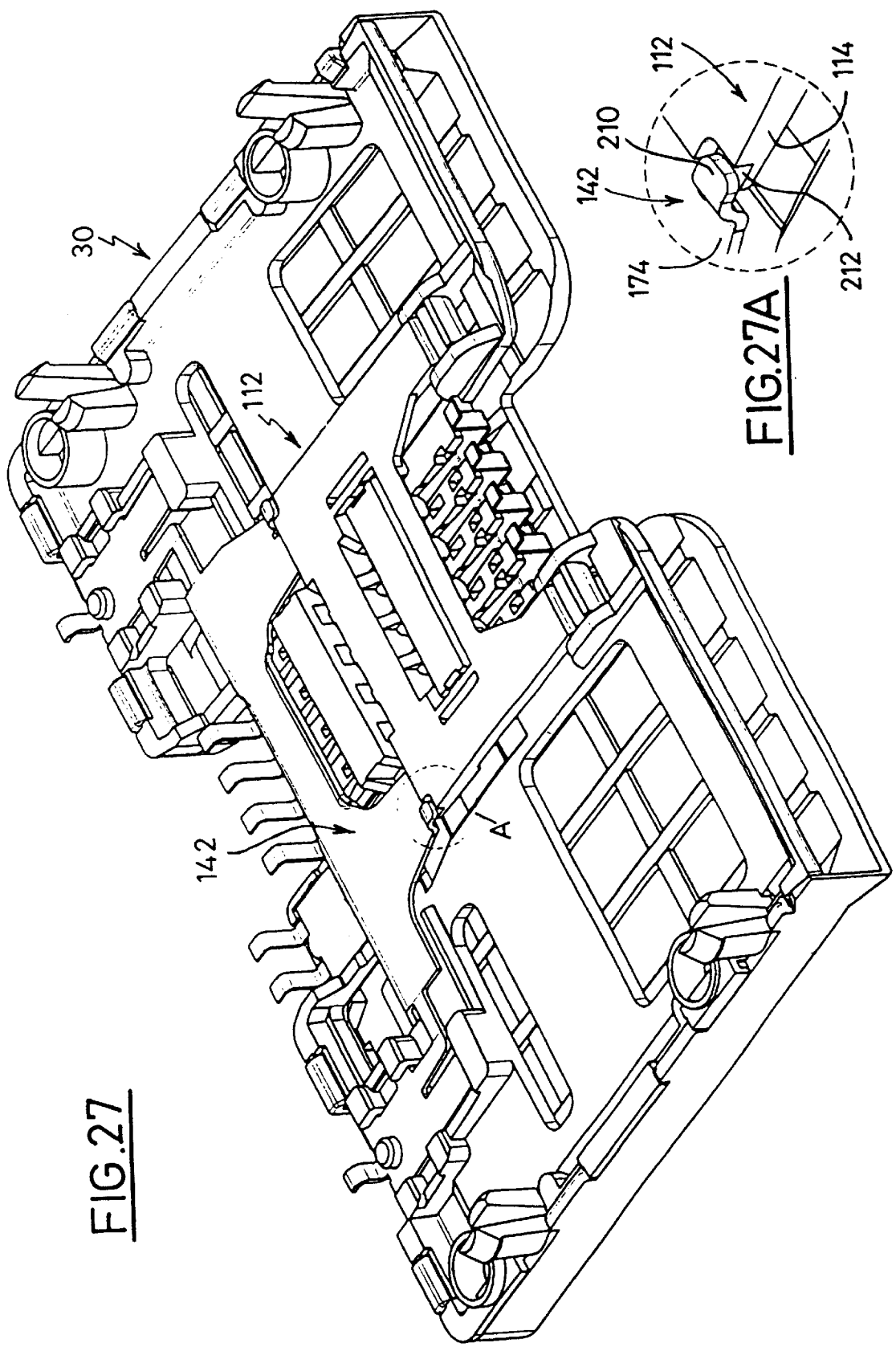

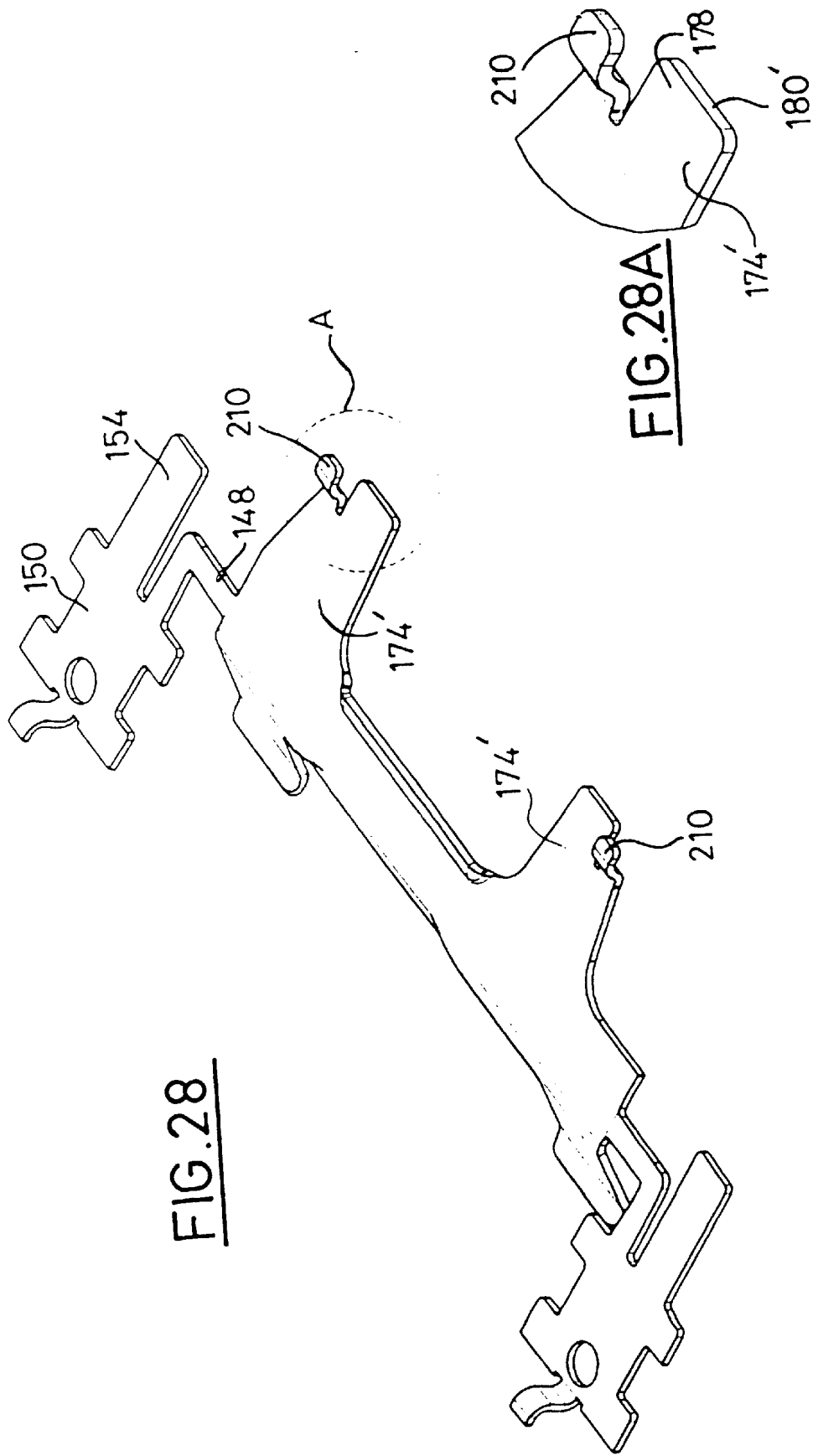

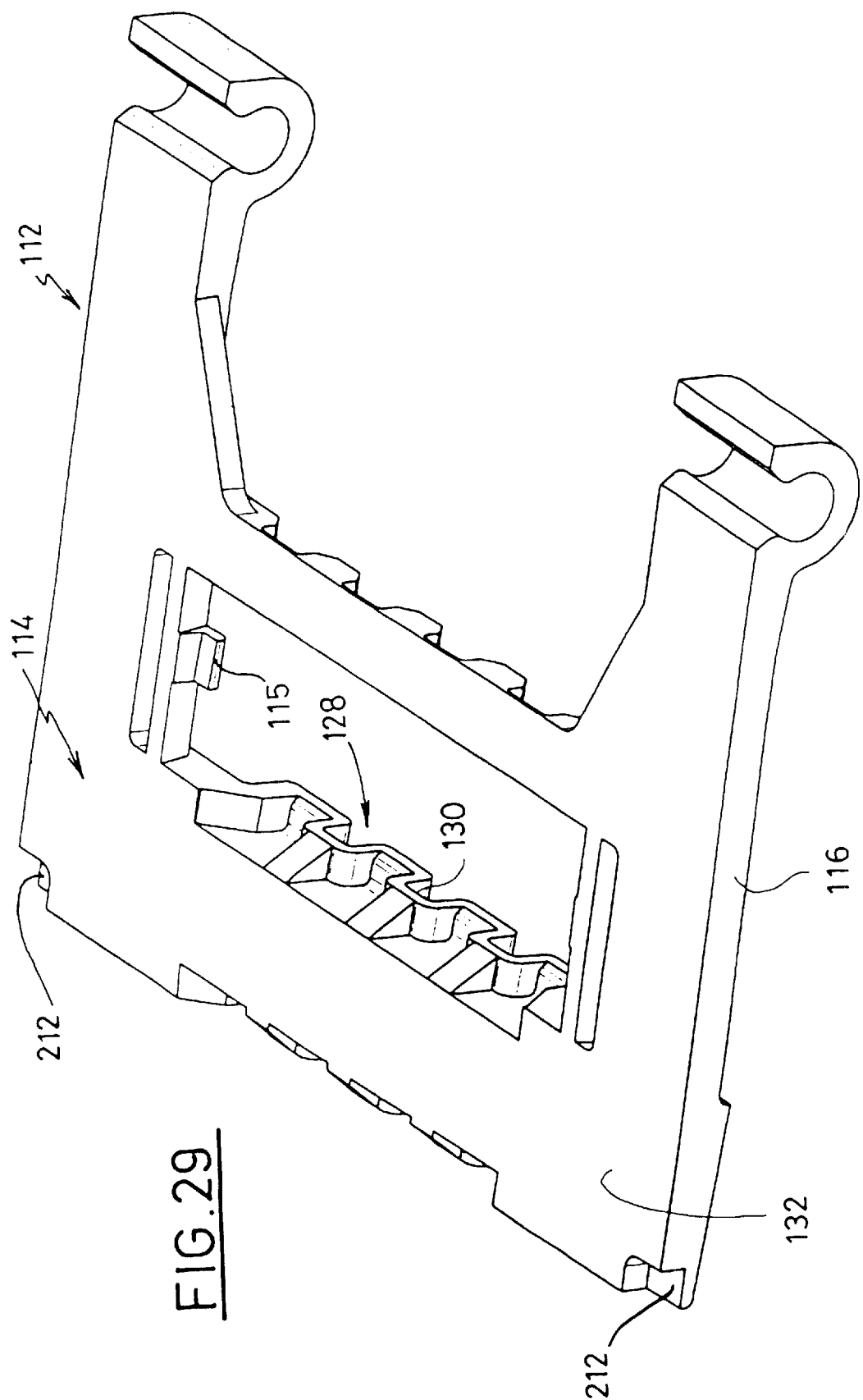

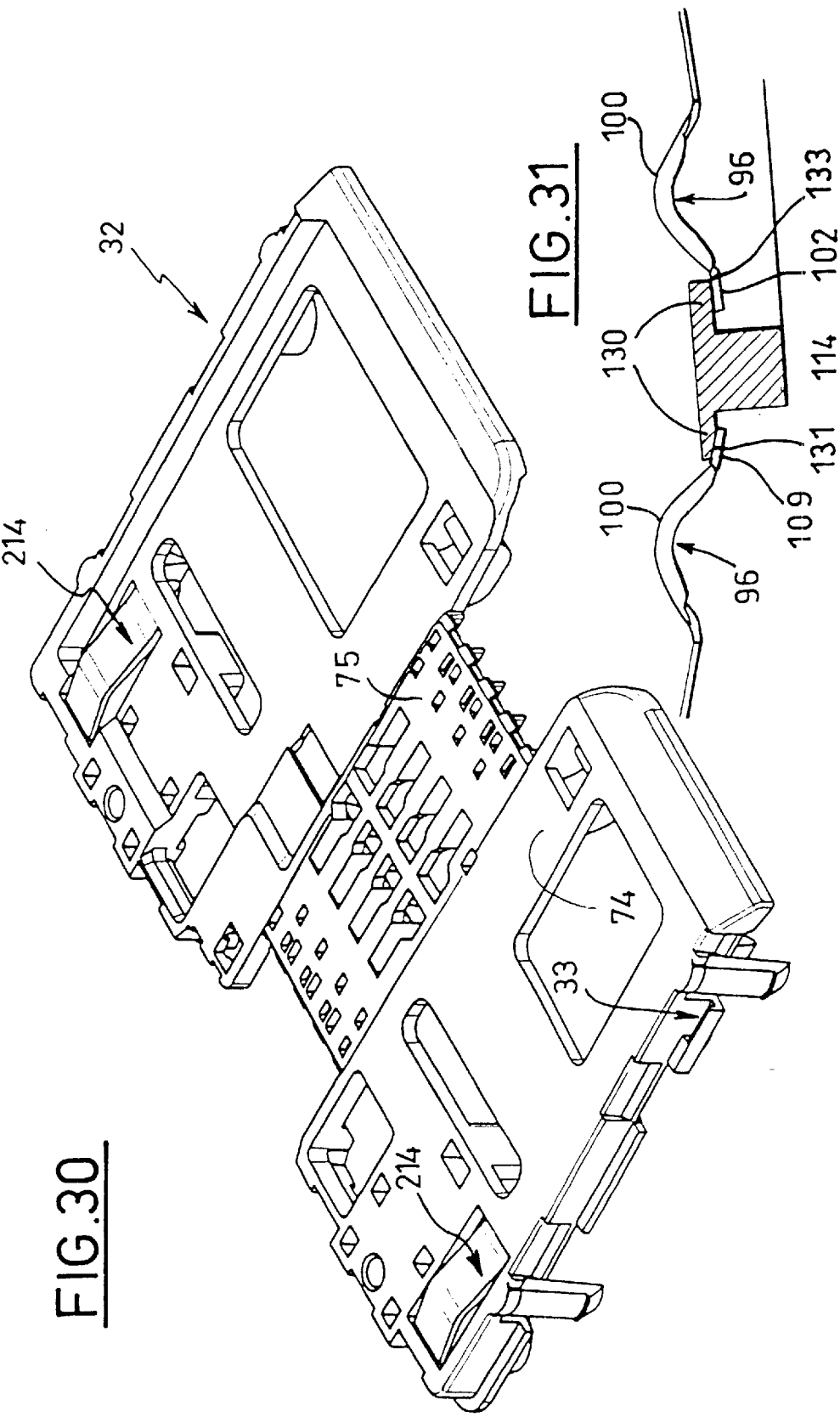

SMART CARD CONNECTOR WITH LANDING CONTACTS

CROSS REFERENCE

This is a continuation-in-part of PCT application PCT/FR98/00934 filed May 11, 1998 which claims priority from French patent application Serial Number 97 05810 filed May 13, 1997.

BACKGROUND OF THE INVENTION

Smart cards come in different sizes, but all are formed of a thin plate of plastic with embedded circuitry connected to contact pads on a lower face of the card. The contact pads can be connected to electronic circuitry by a connector that has pad-engaging contact parts that press against the pads. It is often desirable to construct the connector with "landing" contacts whose pad-engaging parts are held away from the slot, or which press only very lightly into the slot, until the card becomes fully inserted. As the card reaches its fully inserted position, pad-engaging parts of the contacts can press firmly against the pads on the card. This reduces wear on the pad-engaging parts of the contacts.

It has been proposed to provide landing contacts by the use of a pivoting element that is biased by a pair of compression springs to a position where a part of the pivoting element lies in the path of the card, with cams controlling pivoting of a separate lever. Reduction of wear is obtained by using metal rollers, and by using pivot pins to reduce wear in pivoting. All of these separate elements complicate the design, increase its height, and increase the cost. A connector for receiving a smart card and providing landing contacts for engaging the contact pads of the card, which minimized the number of separate parts while assuring high wear resistance despite numerous repeated uses of the connector, in a construction of low height and simple and inexpensive design, would be desirable.

SUMMARY OF THE INVENTION

In accordance with one embodiment of the present invention, a smart card connector is provided which includes contacts having pad-engaging parts that can be landed on the contact pads of the card when the card becomes fully inserted, which uses a minimum number of easily formed parts in a reliable and simple construction. The connector includes a rocker with a pivoting control part having a rear portion lying at the rear of the slot to be deflected by the fully inserted card. The rocker is coupled to the contacts to land them only when the card is close to its full insertion portion. The rocker is formed from a single piece of sheet metal and includes fasteners that are fixed to the housing of the connector and that also includes a pair of integral deflect portions that connect the fasteners to opposite ends of the control part. The deflect portions allow the control part to pivot by resilient deformation of the deflect portions.

The deflect portions bias the control part towards a position where it lies in the slot, by each deflect portion having a torsion bar that is twisted about the axis of pivoting.

The connector includes a lever that is pivotally mounted on the housing about a second axis that is spaced from the axis of pivoting of the control part. The lever has a rear end that is engaged with the contacts to move them in at least one vertical direction, and with the rear end of the lever also engaged with a front end of the control part so the control part can control pivoting of the lever.

The novel features of the invention are set forth with particularity in the appended claims. The invention will be best understood from the following description when read in conjunction with the accompanying drawings.

BRIEF DESCRIPTION OF THE DRAWINGS

FIG. 6 is a top isometric view of the lever of the connector of FIG. 3.

FIG. 7 is a side elevation view of the lever of FIG. 6.

FIG. 8 is a bottom view of the lever of FIG. 6.

FIG. 9 is a rear elevation view of the lever of FIG. 8.

FIG. 17A is a sectional view taken on line A in FIG. 17.

FIG. 21 is a sectional view taken on line 21—21 of FIG. 4, and showing the positions of the lever and rocker prior to installation of a card.

FIG. 22 is a view similar to that of FIG. 21, and showing the positions of the lever and rocker as the card approaches its full insertion position.

FIG. 23 is a view similar to that of FIG. 22, but showing the positions of the lever and rocker when the card lies in its fully inserted position.

FIG. 27 is a bottom isometric view of a connector similar to that of FIG. 2, but which is modified therefrom.

FIG. 27A is an enlarged view of area A of FIG. 27.

FIG. 28 is a view similar to that of FIG. 10, but which shows the modification of FIG. 27.

FIG. 28A is an enlarged upside-down view of a portion of FIG. 28.

FIG. 29 is an enlarged view of the lever of the connector of FIG. 27.

FIG. 30 is an isometric top and front view of the base of the connector which is modified in accordance with the second embodiment of the invention to include a card-braking means.

FIG. 31 is an enlarged sectional view of the central part of FIG. 25, showing a control bar of a lever which engages the contacts.

DETAILED DESCRIPTION OF THE INVENTION

I. Limited Description of the Invention.

Figure 1:
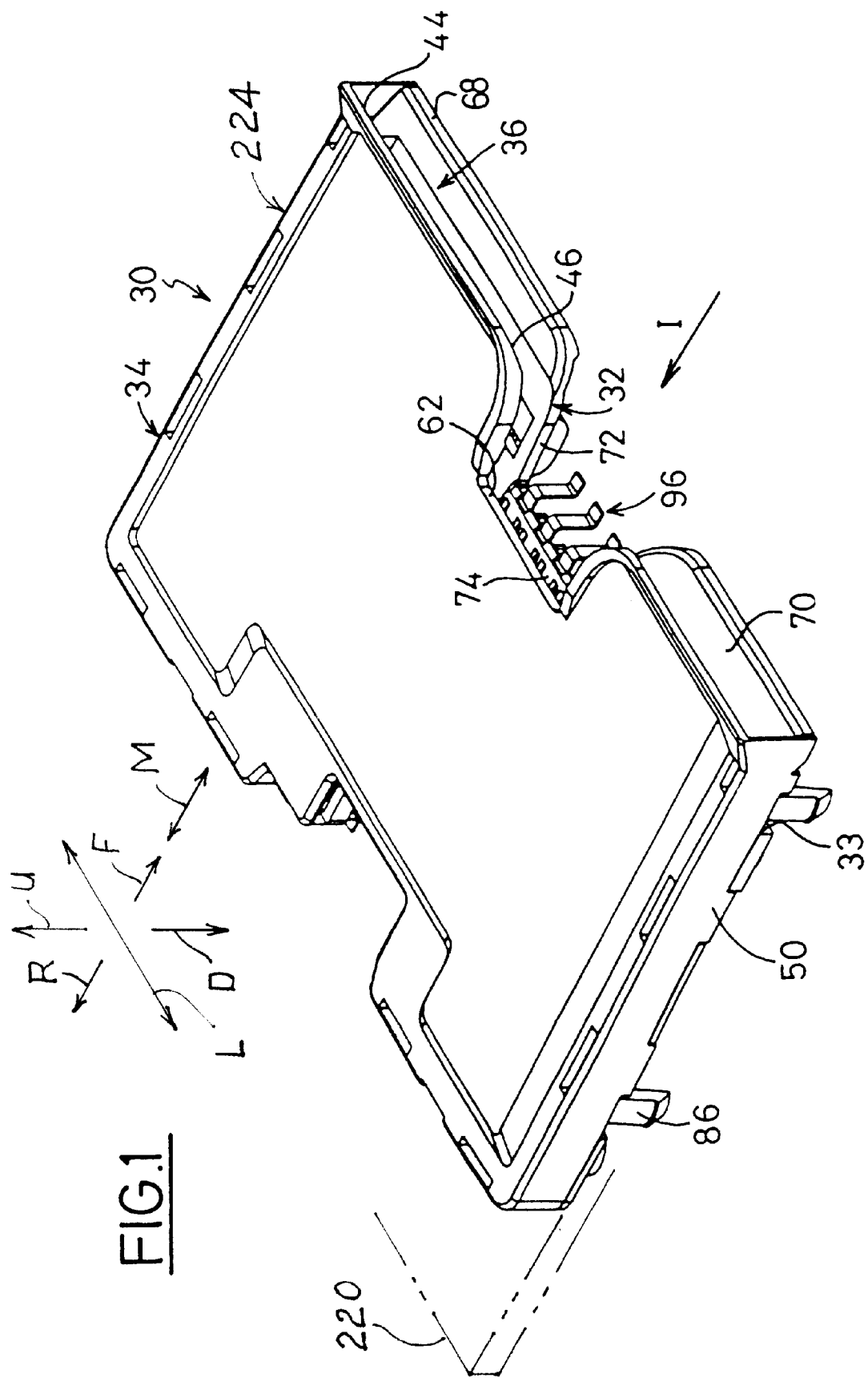
FIG. 1 is a top and front isometric view of an electrical connector of the invention.
Figure 26:
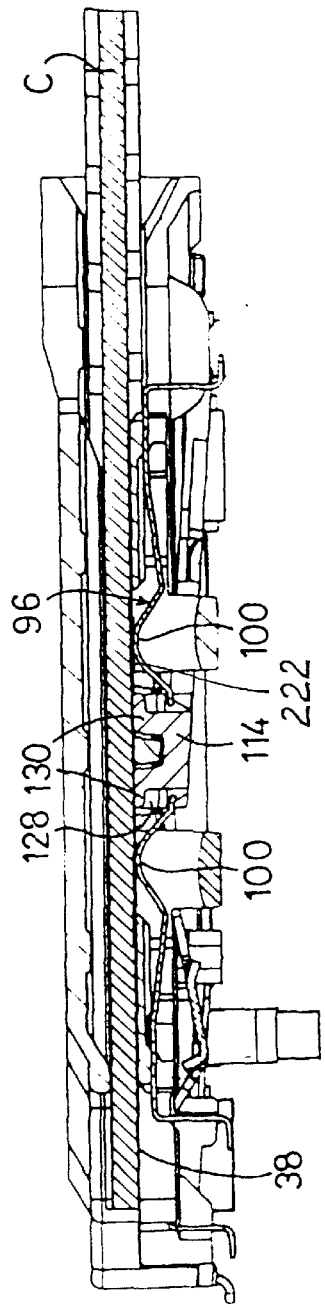
FIG. 26 is a view similar to that of FIG. 25, and showing the positions of the contacts when the lever and rocker are in the positions of FIG. 23.

FIG. 1 illustrates an electrical connector 30 which is designed to be mounted on a circuit board 220 and to receive a smart card by insertion of the smart card in a rearward R direction, as indicated by arrow 1, into a slot 36 of the connector. A smart card is a thin card with embedded circuitry, and with contact pads on a surface on the card for access to the circuitry. It is noted that smart cards come in different sizes. FIG. 26 shows that when the smart card C is fully inserted into the connector, contact pads 222 of the card are engaged by pad-engaging parts 100 of contacts 96 of the connector. In the present connector, the pad-engaging parts 100 of contacts are "landed" onto the card. That is, the parts 100 are pressed firmly against the card only as the card comes close to its fully inserted position shown in FIG. 26. Prior to the card reaching nearly the full insertion, the contact parts 100 press only lightly or not at all against the card. This reduces wear on the contact parts 100 and on portions of the card lying rearward of the contact pads 222.

Figure 2:
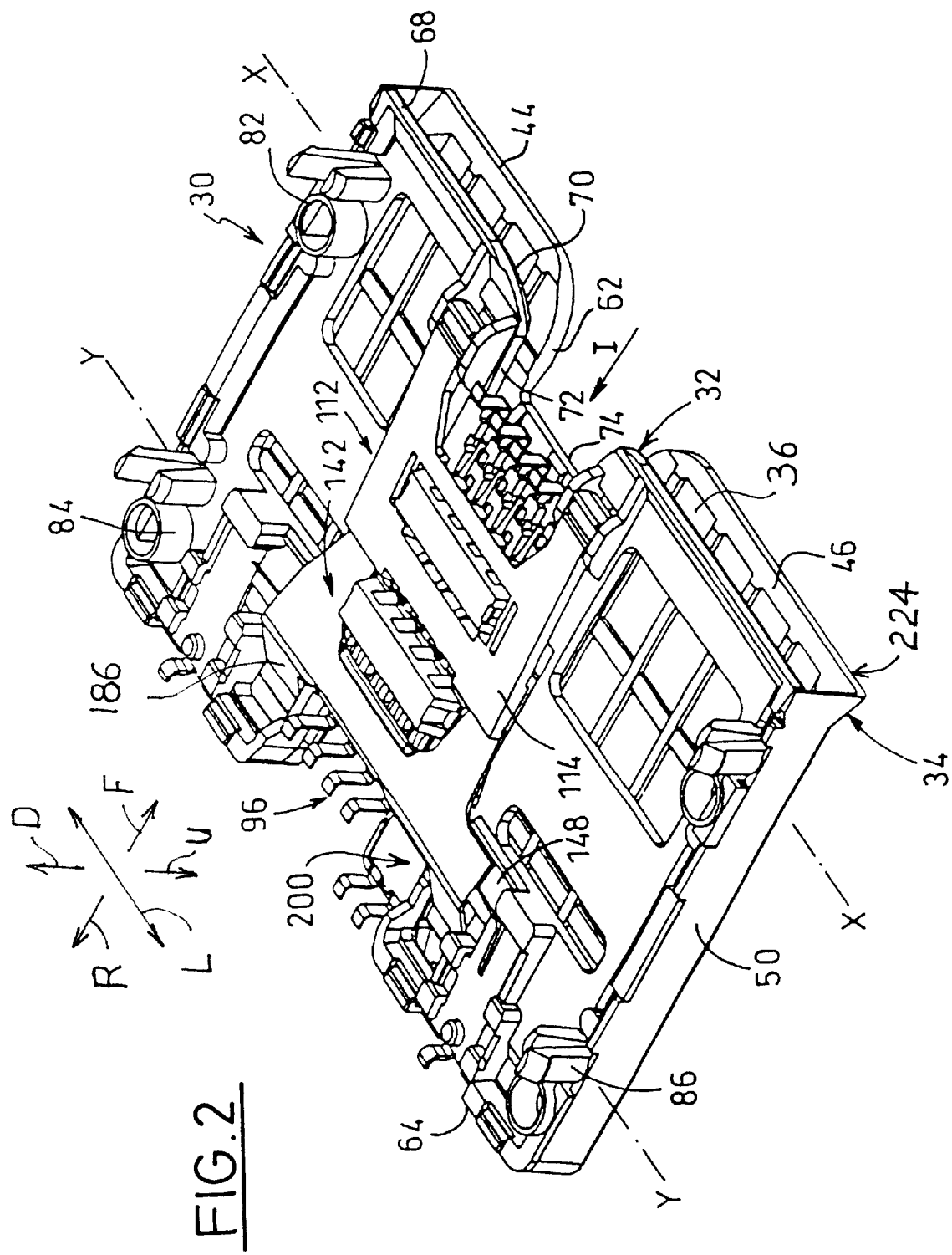
FIG. 2 is a bottom and front isometric of the connector of FIG. 1.

FIG. 2, which shows the connector upside-down from the position of FIG. 1, shows that the connector includes a housing 224 comprising a base 32 and a cover 34, each of which is formed of molded plastic, preferably by injection molding. A mechanism for landing the contacts includes a lever 112 that is pivotally mounted about an axis (X—X) on the base. The axis (X—X) extends in a lateral direction L that is perpendicular to rearward and forward directions R, F. The lever has a control bar 114 at its rear end, which interacts with a rocker 142. The rocker 142, is pivotally mounted on the base about a lateral axis (Y—Y). When a card is inserted rearwardly into the slot 36, the card depresses actuator tabs 186 on the rocker. The rocker then allows the control bar 114 on the lever to rise, to allow parts of the contacts to move up against the card.

Figure 25:
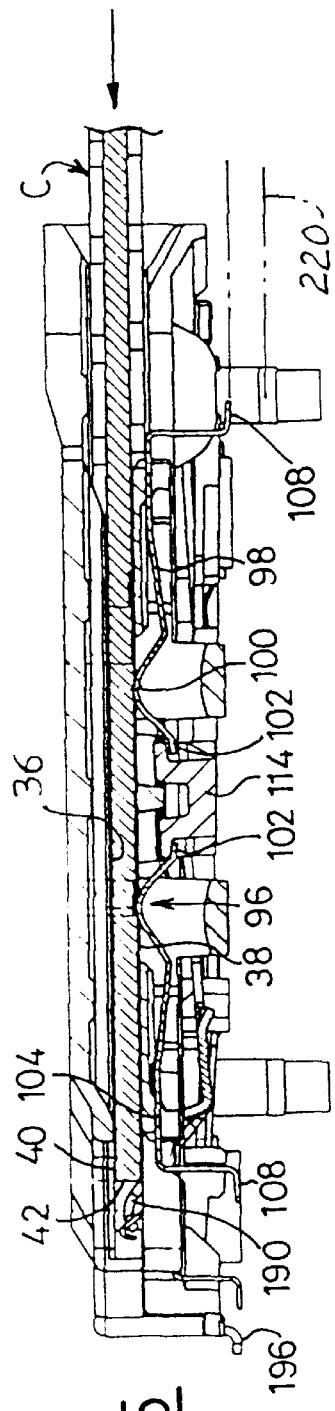
FIG. 25 is a view similar to that of FIG. 24, and showing the positions of the contacts when the lever and rocker are in the positions of FIG. 22.

As shown in FIG. 25, the two rows of contacts 96, 98 each have connect ends or tails 108 that rest against the circuit board 220 and that are soldered to traces on the circuit board. Each connect has a pad-engaging part 100 that engages the card, and has a contact end 102 that can be moved up and down. In this case, the contacts are mounted so the pad-engaging parts 100 are biased to lie in the slot 36 that holds the card. The control bar 114 of the lever serves primarily to push down the contact ends 102 to move down the pad-engaging parts 100. However, it would instead be possible to use the control bar 114 to push up the contact ends, although applicant prefers not to do this. The control bar 114 is moved up to the position shown in FIG. 26, only when the card becomes fully inserted.

Figure 11:
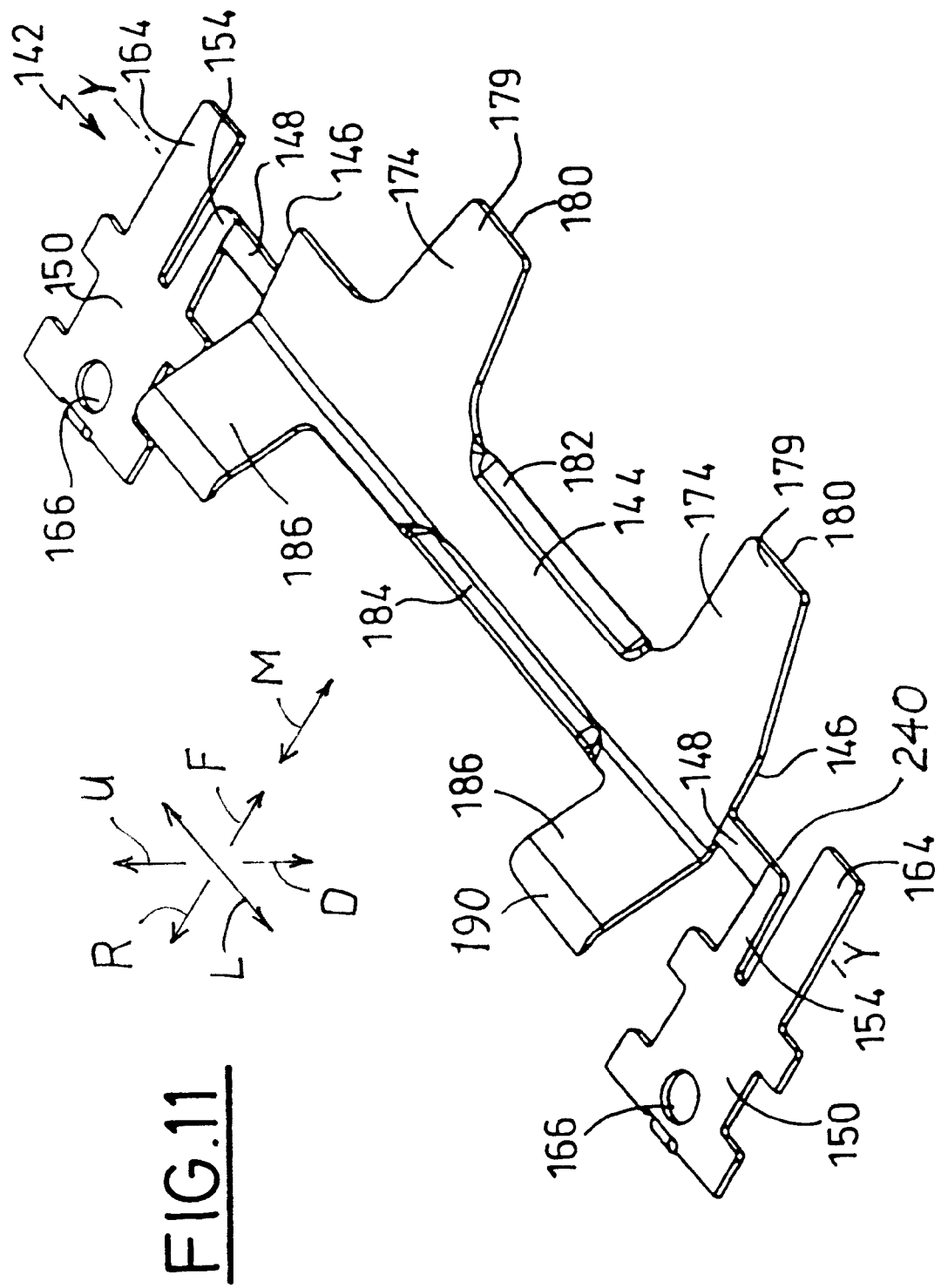
FIG. 11 is a top isometric view of the rocker of FIG. 10.

As the card approaches a fully inserted position, as shown in FIG. 25, a leading edge 42 of the card depresses a curved end 190 of the rocker. FIG. 11 shows that the curved ends 190 lie at the top of the actuator tabs 186 of a control member 144 of the rocker. The control member is pivotable about the axis (Y—Y). The control member 144 has control arms 174 that extend forwardly from the axis. Thus, when a card depresses the actuator tabs 186, the control arms 174 pivot upward. Upward movement of the control arms 174 allows the lever 112 of FIG. 21 to pivot up.

FIG. 21 shows the initial position of the connector, with the control portion or member 144 of the rocker positioned with the actuator tab rear ends 190 lying in the card slot 36 and with the control arms 174 of the control member lying over ribs or surfaces 140 of the lever. FIG. 22 shows the card C as it approaches its fully inserted position, with the front edge of the card beginning to depress the rear end 190 of the actuator tabs of the rocker. FIG. 23 shows the card fully inserted with the rocker control portion 144 having pivoted about the axis (Y—Y) so the rocker controls arms 174 are raised. This allows the lever 112 to pivot clockwise to the position shown in FIG. 23, to allow the pad-engaging parts of the contacts to move up firmly against contact pads of the card C.

Figure 24:
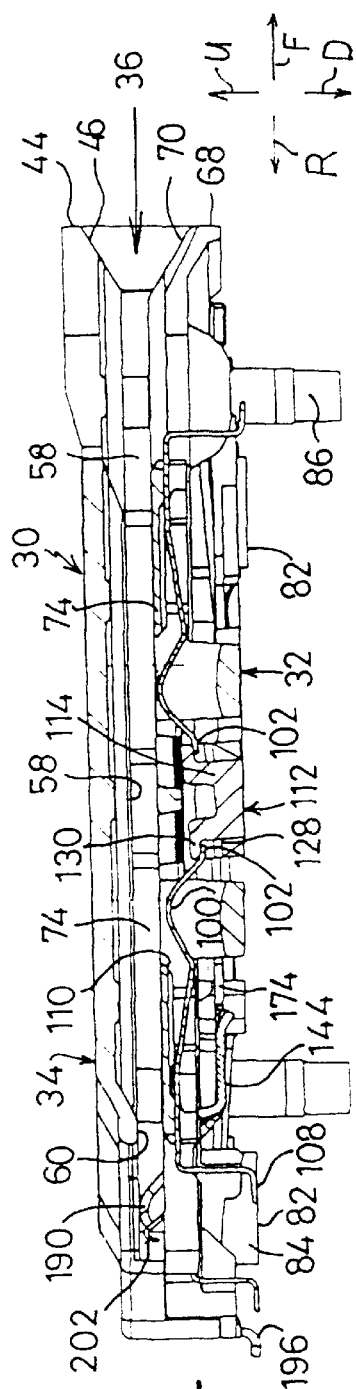
FIG. 24 is a view taken on line 24—24 in FIG. 4, and showing the positions of the contacts when the lever and rocker are in the position of FIG. 21.

FIG. 24 shows the lever 112 with its control bar 114 pivoted down due to the curved end 190 of the rocker control member having not yet been pivoted down. The control bar 114 prevents the contact ends 102 from moving up, to keep the pad-engaging parts 100 down. FIG. 25 shows the pad-engaging parts 100 very lightly pressing against the card, to minimize wear, while FIG. 26 shows the parts 100 pressing upwardly firmly against the card. FIG. 26 shows the control bar 114 having been released to allow the pad-engaging parts 100 to move up. As shown in the FIG. 23, such upward movement of the control bar of the lever 112 is due to the control portion 144 of the rocker having been pivoted by the card reaching its full inserted position.

Since the contacts 96, 98 of FIG. 25 tend to move up, a resilient force is required to keep the rear end 190 of the control portion 144 upward against the biasing of the contacts. In the prior art, this was accomplished by separate compression springs.

In accordance with the present invention, applicant constructs the rocker, shown in FIG. 11, so the control member or portion 144 of the rocker is biased towards a position with its control tabs 186 and tab ends 190 upward without requiring separate springs that would have to be separately mounted and without requiring pivot pins or other means for separately pivotally mounting the control portion 144. The rocker 142 is provided with fastening parts or plates 150 at laterally opposite ends of the rocker, which are fixed in place to the base of the connector housing. The rocker also includes a pair of couplings 240 that couple each fastening plate 150 to a corresponding end 146 of the control portion 144. Each coupling 240 includes a beam 154 that extends longitudinally M, or in forward and rearward directions, and a torsion bar in the form of a connecting strip 148 that extends laterally L. When the control portion 144 pivots about the axis (Y—Y), the connecting strips 148, which are elongated in the lateral direction, allow such pivoting about the axis (Y—Y) by twisting. Such twisting is aided by the beams 154 whose forward ends move slightly when the control arms 174 of the control member move up. It would be possible to use only the beam 154 or only the torsion bars 148 to permit pivoting, but the combination reduces twisting or bending of each of these parts 148, 154 and provides greater flexibility in a space of limited lateral width L and limited longitudinal M length. The provision of the coupling 240 also avoids the need for a separate pivotal mounting of the control member 144 on the base of the connector housing. The mounting also assures substantially zero frictional pivoting of the control members, all in a simple arrangement.

Figure 10:
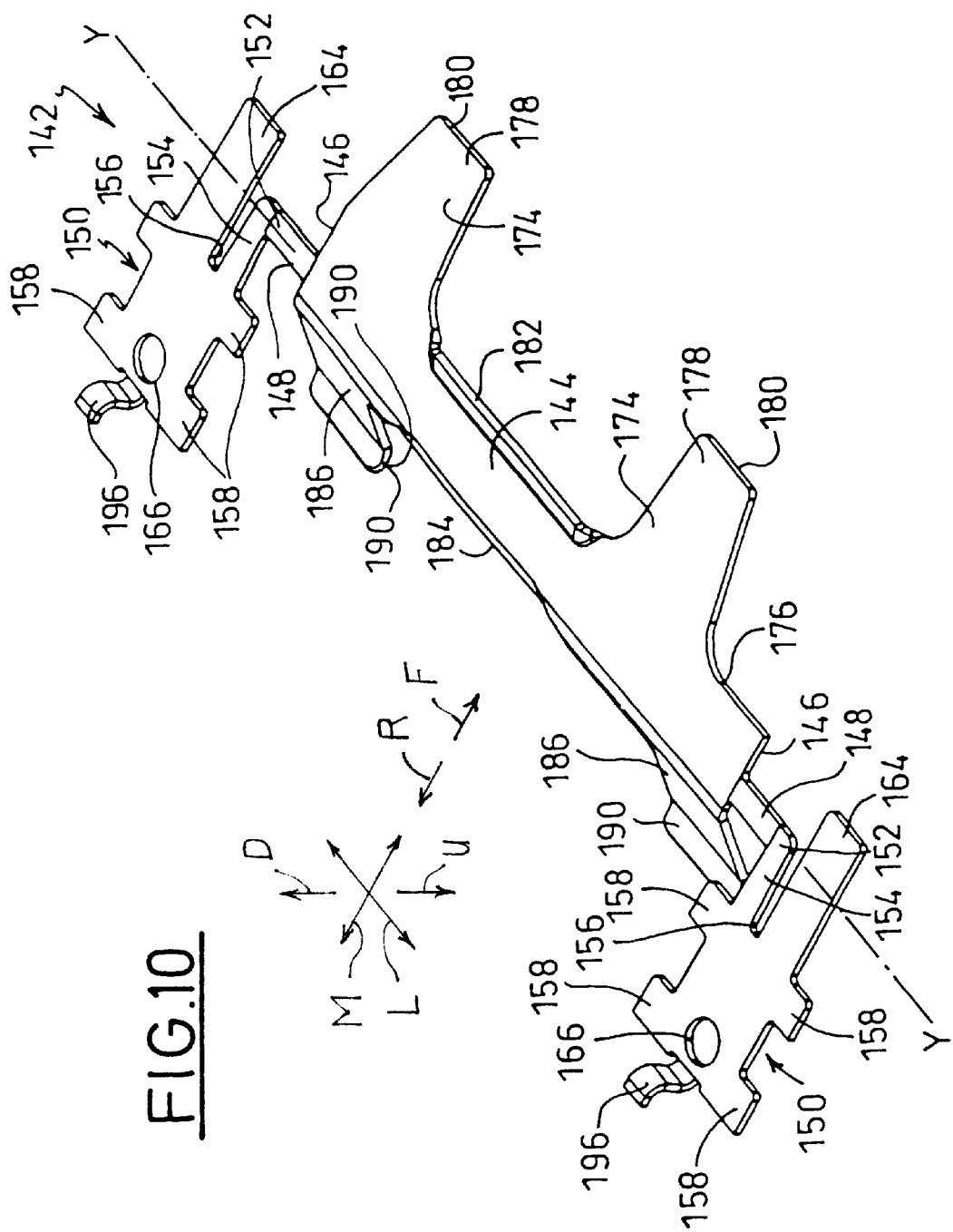
FIG. 10 is a bottom isometric view of the rocker of the connector of FIG. 2

The rocker 142 is formed from a single piece of sheet metal that has been cut and bent to the shape shown in FIGS. 10 and 11. Conductivity of the rocker can be used to help provide a ground for the connector. FIG. 10 shows that the fastening plates 150 have terminal tabs 196, which are soldered to earth or grounded, traces on the circuit board.

FIG. 6 shows that the lever 112 has receptacles 128 that each receives an end of a contact to hold down the contact end until the control bar 114 of the lever is released by movement of the rocker control member to a released position. Since the control bar 114 of the lever touches the contacts, the lever 112 is formed of dielectric material, and is preferably formed by molding.

II. Detailed Description of the Invention

In the following description, terms such as "horizontal", "vertical", "upper", "lower", etc. are used. However, the connector can be used in any orientation.

The figures illustrate an electrical connector 30 (FIG. 1) which includes a housing 224 comprising a contact-carrying support or base 32 made of insulating material, and an upper cover 34. The connector 30 has a rectangular parallelepipedal general shape. At its front end, it has a slot 36 for the longitudinal M insertion of a card C (see FIGS. 21 to 26) of plane rectangular general shape, a model or outline of which is partially illustrated in FIGS. 22, 23 and 25, 26. The card has two main plane faces, namely a lower face 38 (FIG. 25) and an upper face 40. The card has a front laterally-extending, or transverse edge 42 which extends perpendicular to the direction I of insertion of the card C into the slot 36 of the connector 30. The cover 34 (FIG. 1) is a plastic moulding in the general form of a rectangular plate, the front transverse edge 44 of which has a chamfer 46 which facilitates the insertion of the card C into the slot 36. The slot has opposite internal faces 48 (FIG. 3) in the side walls 50 of the cover 34 which engage the laterally opposite edges of the card C in order to guide it slidingly in the direction I.

The cover 34, near its rear-end transverse edge 52, has, in its internal face 54, two transversely opposed stops 56. The front edge 42 of the card C engages the stops in order to define the inserted position of the card C in the connector 32.

The card C is guided vertically as it is being introduced into the connector 30 by the card upper face 40 engaging bearing regions 58 formed on two central ribs in relief on the internal face of the cover 34, and by a coplanar bearing plane 60 formed near the stops 56. In order to prevent the opposing faces of the card C from being scratched, each bearing rib 58 may be replaced by two profiled bosses arranged consecutively along the longitudinal direction.

This solution also saves on material.

The front transverse edge 44 of the cover 34 has a central recess or indentation 62. The indentation facilitates the operations of connecting the connection tabs of the contact blades by soldering, and it allows short contacts to be used. The lower edges of the side walls 50 and of the vertical back wall 64 have a series of hooks 66 for fastening the cover 34 to the base 32.

The base 32 is molded of insulating plastic having the general shape of a recessed rectangular plate. The base is bounded longitudinally by a front transverse edge 68 (FIG. 2) which has a chamfer 70 and a recess 72, the functions of which are identical to those of the chamfer and recess in the cover.

The upper face 74 (FIG. 1) of the base 32 is a plane surface parallel to the surfaces 58 and 60 (FIG. 3) of the cover 34. These surfaces form the top and bottom of the slot 36 (FIG. 1) for inserting the card C. The lower face 38 (FIG. 25) of the slot is flush with the upper plane face 74 of the base 32. In FIGS. 21 to 26, the connector is illustrated with the face 38 of the card C, which carries the connection areas or pads, oriented downwards. However, in many applications the connector is upside down so the face 38 of the card which carries the contact pads is upwards. In that position, the card tends to rest with its upper face 40 on the ribs of the cover 34.

Where the contact pads of the card project slightly from the lower face of the card, it is possible to provide a groove 75 (FIG. 30) about one tenth of a millimeter in depth to avoid damage to the pads. Such groove is at the level of the contacts.

The lower edges of the side faces 78 (FIG. 13) and of the rear transverse face 76 of the base 32 have catching regions 80 with which the beak-shaped ends of the hooks 66 of the cover 34 engage. The vertical position of the hooks with respect to the base 32, is defined by the point where the lower edges 67 (FIG. 3) (between the hooks 66) of the cover 34 come to bear on upper bearing facets 81 located between the catching regions 80. In the assembled position, and as may be especially seen in FIGS. 1 and 2, the base 32 and the cover 34 constitute an assembly in the form of a rectangular box.

The base 32 is, for example, designed to be fastened to a printed-circuit board on which it bears vertically via the annular lower edges 82 (FIG. 2) of four cylindrical feet 84. The feet extend vertically downward beneath the base 32. The lower face of the base has, near the feet 84, four pairs of harpoons 86 designed to ensure that the base 32 catches vertically on the printed-circuit board. According to another arrangement, the base may be mounted via the same harpoons on a simple support plate and the connection tabs of the contacts are connected to the electronics of the equipment via a flexible circuit.

The feet 84 extend vertically from the lower face 88 (FIG. 13) of the base 32 so as to form, between the said lower face and the upper face of the printed-circuit board, a space over about the entire area of the connector. This area can receive electronic components fastened to the printed-circuit board as well as parts formed in relief on the lower face 88 or elements of the connector which are attached to this lower face.

In its shorter central portion 90, bounded by two transverse or laterally-extending edges, namely the front transverse edge 92 and the rear transverse edge 94, the base 32 constitutes a support for two rows 96 (FIG. 3) of electrical contacts, each row having four contacts. Each electrical contact 96 has an elastically deformable blade which has a central section 98 of longitudinal orientation. The central section has a pad-engaging part 100 closest to the longitudinal center of the connector, which has an upper convex face. The contact has a beak-shaped free end 102 (FIG. 25). Each central section 98 (FIG. 3) is connected to its other end by a fastening part 104 having, in particular, a harpoon 106. Each contact 96 is extended longitudinally beyond its fastening portion 104 by a connection end 108 in the form of a tab which is intended to be connected by soldering or brazing to conducting tracks on the upper face of the printed-circuit board. According to a known embodiment, the contacts may be of the type to be poked into holes in the printed-circuit board.

Figure 3:
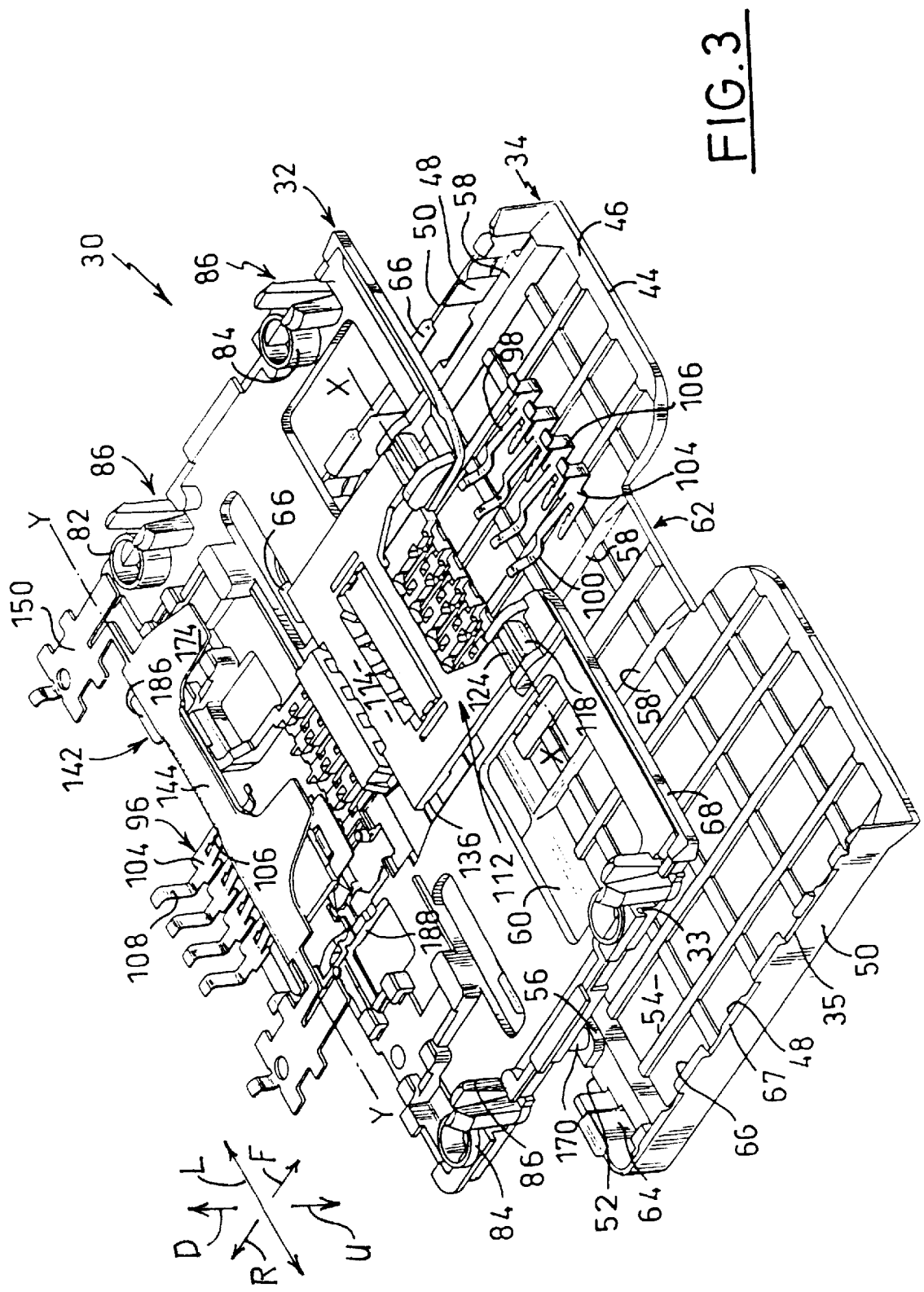
FIG. 3 is an exploded bottom isometric view of the connector of FIG. 2.

The contacts 96 are elastically deformable, that is to say that their free end part 100, 102 (FIG. 25) can flex vertically with respect to their fastening part 104 (FIG. 3). In their non-flexed rest state, the curved ends 100 of the contacts 96 normally project vertically above the plane of the upper face 74 (FIG. 2) of the base 32, against which face the lower face 38 (FIG. 25) of the card C slides, through openings 110 (FIG. 24) formed for this purpose in the contact-carrying central part of the base 32.

To provide a landing function for the contacts 96, the connector 30 is provided with a pivoting lever 112 (FIG. 3) which carries a bar 114 for controlling the pad-engaging ends 100 of the contacts 96. As shown in FIGS. 6 to 9, the lever 112 has a general form of a U, the branches of which consist of two longitudinally-extending legs 116 which are connected near their rear longitudinally ends by the transverse control bar 114. The front end 118 of each leg 116 is shaped in the form of a semicylindrical pivot bearing 120 which emerges in the lower face of the lever 112 via a radial slot 122. This allows the insertion into the bearing 120, by elastic fitting, of a corresponding pivot-pin 124 (FIG. 13) which is moulded together with the base 32 and which extends under the face 88 of the latter between two longitudinally oriented vertical side walls 126. The lever 112 (FIG. 3) is thus mounted so as to pivot with respect to the base 32 about the transverse geometrical axis X—X of the sections 124.

The control bar 114 (FIG. 6) has, in its central part, two series of four receptacles 128. Each receptacle has partitions 130, each of which is longitudinally opened to the rear or to the front so that each of them accommodates a beak-shaped contact end 102 (FIG. 25) of a contact 96. Each receptacle 128 (FIG. 6) is also open downwards. At its rear end 132 (FIG. 8) and in its upper face 134 (FIG. 6), each leg 116 has a longitudinal groove 136 which has, at the rear end edge 138 (FIG. 7), a rib 140. The two ribs 140 are arranged at laterally opposite ends of the bar 114, on each side of its central portion for controlling the contacts. The ribs constitute two surfaces for controlling the pivoting movements of the lever 112 about its axis X—X, as will be explained below.

A description will now be given of the single device or rocker 142 (FIGS. 3 and 23) for actuating the lever 112 and for elastically returning the latter to its retracted position. As shown in FIGS. 21 and 24, the curved contact ends 100 (FIG. 24) of the blades 96 are moved downward away from the upper face 74 of the base 32, against their intrinsic springiness.

Figure 12:
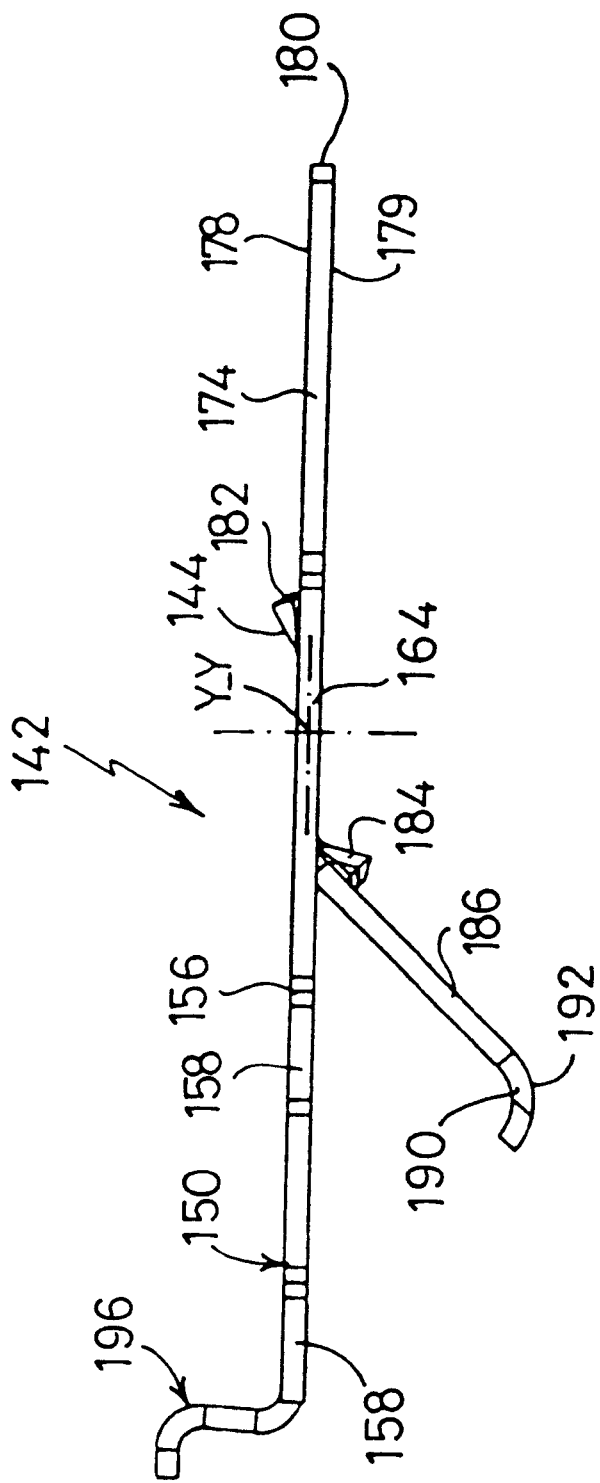
FIG. 12 is a bottom side elevation view of the rocker of FIG. 10.

As may especially be seen in FIGS. 10 to 12, the rocker 142, is made of a single piece of sheet metal shaped by cutting and folding. The rocker 142 (FIG. 10) has approximately a general symmetry of design with respect to the vertical mid-plane of the connector (which is normal to axis Y—Y), in the same way as the lever 112 and the central part 90 of the base 32 forming the support for the contacts 96. The rocker 142 has a central control part 144 in the form of a plate. The central part is oriented substantially horizontally in the connector 32 when the rocker is in its first angular position. The central part 144 is "hung" under the lower face 88 of the base 32. For this purpose, the transverse member 144 is extended, at each of its two opposite transverse ends 146, by a connecting strip 148 which extends laterally towards the outside in a plane parallel to that of the transverse member 144. Each strip can twist.

Each connecting strip 148 extends between the transverse member 144 and one of two side plates 150 for fastening the rocker 142 under the lower face 88 (FIG. 21) of the base 32, the strips 148 thus defining, as will be explained below, an axis of rotation or of rocking of the transverse member 144 as well as of the elastic torsion bars.

Near its transverse end 152 (FIG. 10), each strip 148 is connected to the fastening plate 150 by a longitudinal connecting beam 154 which extends from the front to the rear as far as the front transverse edge 156 of the plate 150. The fastening plates 150, the longitudinal beams 154 and the strips 148 all extend approximately in the same plane as the transverse member 144 when the rocker 142 is not elastically deformed, i.e., as it is illustrated in FIGS. 10 to 12. This design simplifies the operations of cutting out the rocker from a metal sheet and guarantees accuracy in the dimensions of the piece.

The beams 154 together with the strips 148 make it possible to increase the amplitude of the rocking movements and thus to reduce the length of the rocker 142 along the axis Y—Y. The beams 154 constitute an elastic transition, as they are elastically deformable in flexure between the strips 148 forming the torsion bars and the rigid stationary plates 150. This elastic transition decreases the level of the stresses at the end of the bars 148 and contributes to the elastic rotation of the transverse member 144.

The slight vertical translation of the transverse member 144 resulting from the elastic transition due to the beams 154, which would normally be deleterious to the proper operation of the rocker 142, is of the second order, and can therefore be neglected, and the transverse member 144 may be regarded as rocking about the axis Y—Y.

Each of the fastening plates 150 has a rectangular general outline and has four coplanar transverse tabs 158 for it to be mounted, in a bayonet-type manner in four complementary housings or notches 160 (FIG. 13) which are formed above a lower plane region 162 for supporting and fastening a plate 150. The bayonet-type mounting is performed by longitudinally inserting the tabs 158 into the notches 160 from the rear to the front. The support for the plates 150 is completed by the interaction of two coplanar blades 164 which extend longitudinally M towards the front from the edges 156 of the plates 150 and each of these blades 164 is provided so as to extend opposite and bear against a complementary surface 165 (FIG. 13) of the base 32 adjacent to the surface 162.

As may be seen in the detail illustrated in FIG. 17A, the surfaces 162 of the base and 164 of the rocker are not horizontal, that is to say they are not parallel to the general plane of the upper face 74 (FIG. 1) of the base. In the mounted position, the general plane of the rocker 142 is thus inclined so as to make an acute angle "a" of approximately 4° below the lower face 32 of the base in order for the rocker 142, as will be explained later, to be in a state of equilibrium in which the torsion bars are prestressed when the rocker is in its first angular position.

Figure 4:
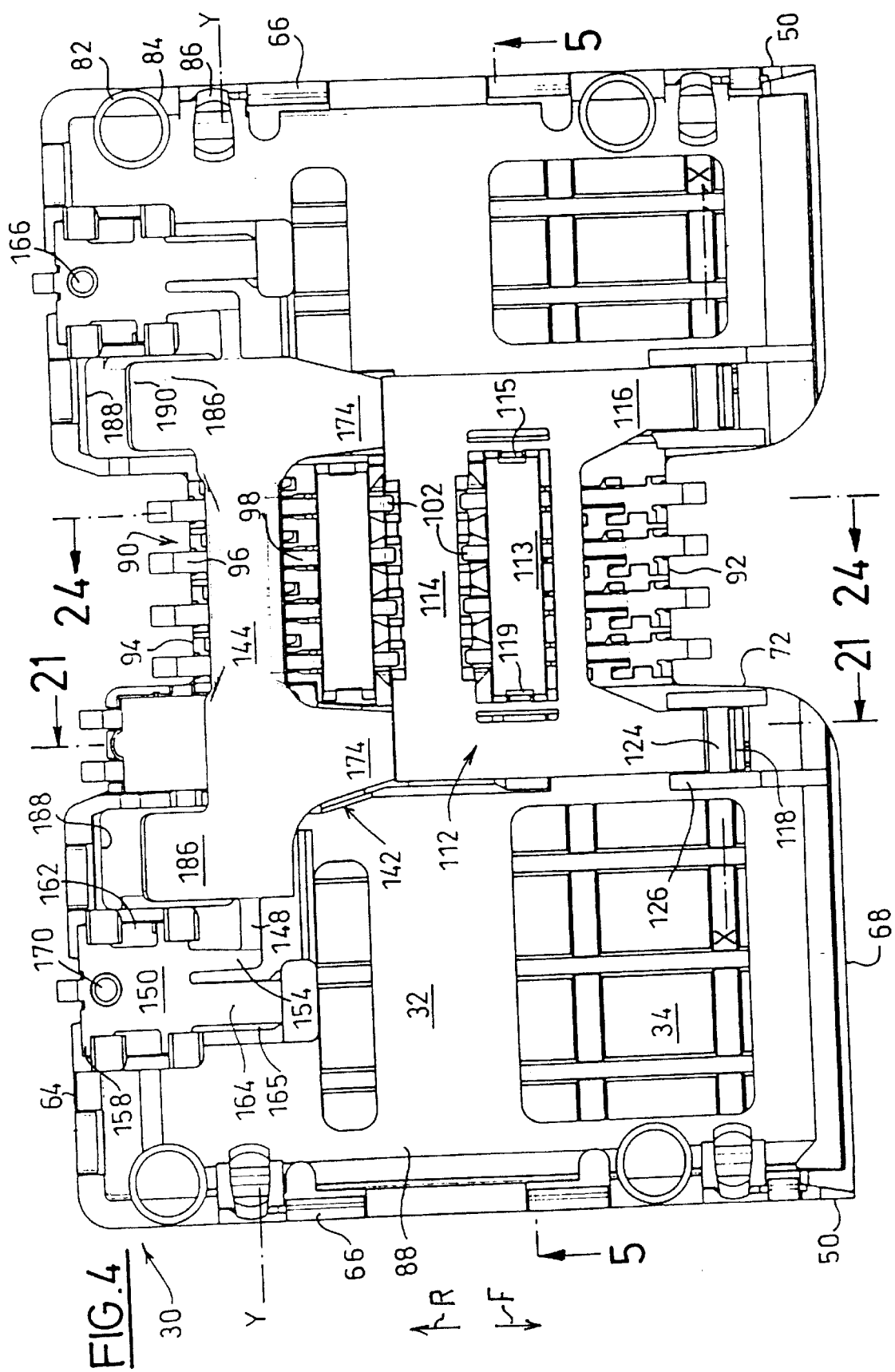
FIG. 4 is a bottom elevation view of the connector of FIG. 2.
Figure 19:
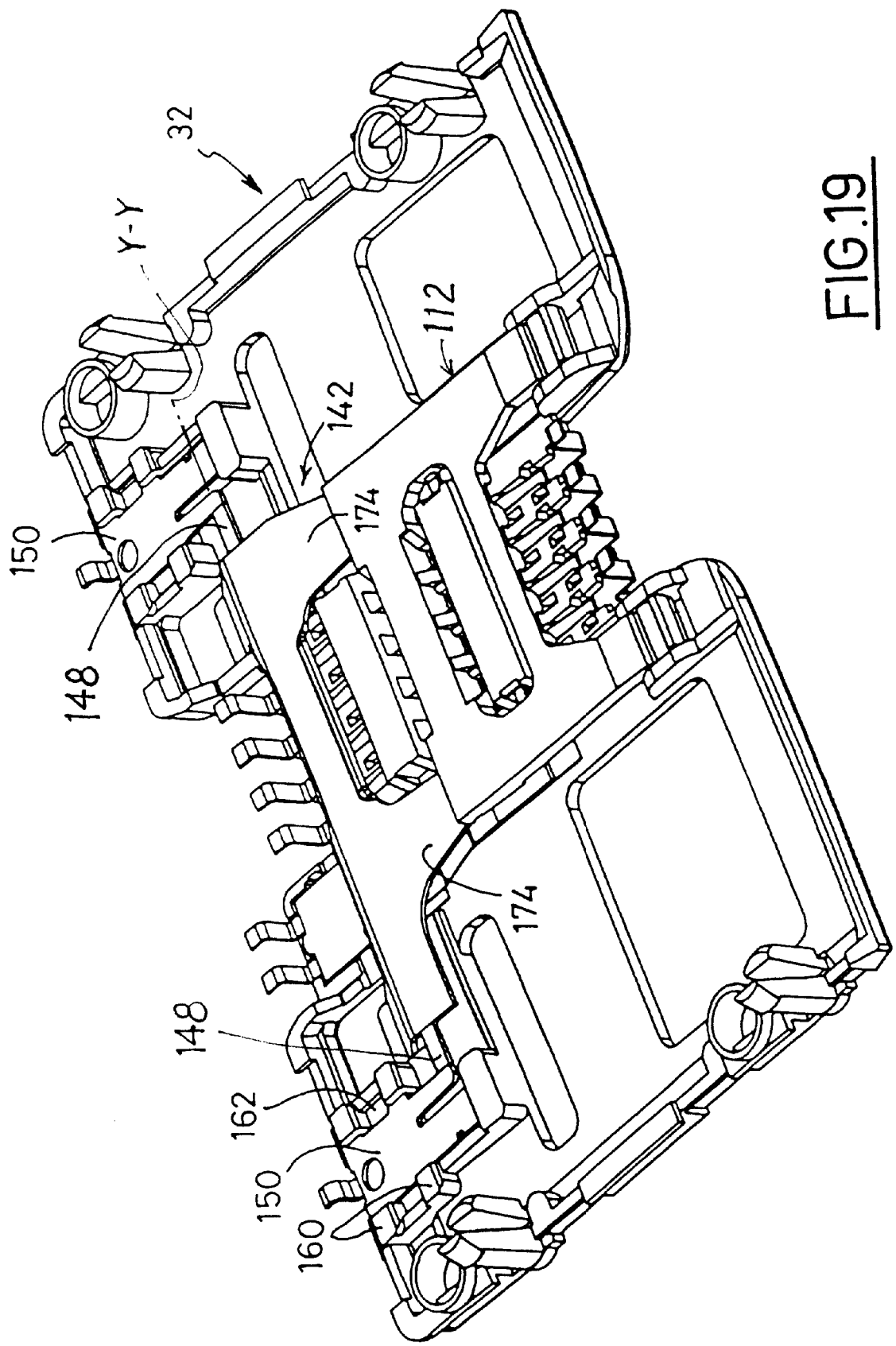
FIG. 19 is a view similar to that of FIG. 18, but with the rocker fully installed on the base.

Each of the fastening plates 150 (FIG. 10) also has a hole 166 which is designed to be opposite a complementary emerging hole 168 (FIG. 13) formed in the base 32. These aligned holes 166, 168 are designed to house the fingers 170 (FIG. 13) which extend vertically downward from the internal, or lower, face 54 of the cover 34, when the cover 34 is fastened to the base 32. The rocker 142, in its position mounted under the base 32, and as may be seen especially in FIGS. 2, 4, and 19, is fastened by its plates 150 under the lower face of the base 32. The main central or control part 144 of the rocker, can rock about a geometrical axis of rotation Y—Y corresponding approximately to the strips 148. The rocking movements are performed in opposition to the elastic return force of the rocker 142 which is applied to it by the strips 148 constituting two torsion bars which elastically return the transverse member 144.

In order to operate the lever 112, and more particularly to act on the control surfaces 140 (FIG. 6) formed at the rear longitudinal ends 138 (FIG. 7) of the legs 116, the rocker 142 (FIG. 10) has two transversely opposed parallel control arms 174. Each control arm 174 extends, in a coplanar manner, from the front laterally-extending edge 176 of the control part 144.

In the assembled position of the various components of the connector, and as may be seen in particular in FIGS. 21 to 23, the lower face 178 of each of the rear longitudinal ends 180 of the control arms 174 bears vertically against a surface 140 of the lever 112. The control arms 174, together with the control part 144, form a rigid assembly, that is to say that they cannot bend vertically with respect to the plane of the transverse member 144. This rigidity is increased by a laterally-extending rib 182 formed between the arms 174 in the front transverse edge of the transverse member 144. The rear transverse edge of the transverse member 144 also has a reinforcing rib 184 which extends laterally between two tabs 186 for actuating the rocker 142 by the card C. It is possible, by way of variant, for the rib 184 to extend over the entire transverse width of the transverse member, or central member, between the tabs 186.

Each actuating tab 186 extends rearward from the transverse member 144, making an angle of approximately 45° with the general plane of the latter and of the control arms 174. The actuating tabs 186 thus extend rearwards and vertically upwards, each through a tab hole 188 (FIG. 13) formed in the base 32. The curved free end 190 (FIGS. 10 and 21) of each actuating tab 186 extends so as to project vertically above the upper face 74 of the base 32 inside the slot 36, as is illustrated in particular in FIGS. 21, 22 and 24, 25, this being the situation until the card C has been fully inserted into the connector 30.

In order to improve the performance and reliability of the connector further, it is possible to provide each actuating tab 186 with a longitudinal reinforcing rib (not illustrated) in the region of its angled connection to the transverse member 144.

The convex upper face 192 (FIG. 10) of the curved end 190 of each tab forms a cam profile with which the front transverse edge 42 of the card C engages at the end of the insertion phase of the card C into the connector 30.

Like the control arms 174, the actuating tabs 186 form, with the transverse member 144, a rigid assembly which does not deform under the action of the card C. This assembly is capable of rocking about the axis Y—Y by deformation of the torsion bars 148 and of the beams 154. The rocker 142, which is a metal piece with a "spring" property, has two terminal tabs 196 for connecting the fastening plates 150 to a ground trace of the printed-circuit board, the connecting tabs 196 being soldered to the printed-circuit board at the same time as the tails 108 (FIG. 3) of the contacts 96.

In the assembled position of the constituent components of the connector, the upper face 178 (FIG. 22) of each of the control arms 174 extends opposite a stop surface 181 formed opposite it in the lower face of the base 32.

The method of assembling the various components for the purpose of producing a connector 30 will now be described, with reference in particular to FIGS. 13 to 20.

Figure 13:
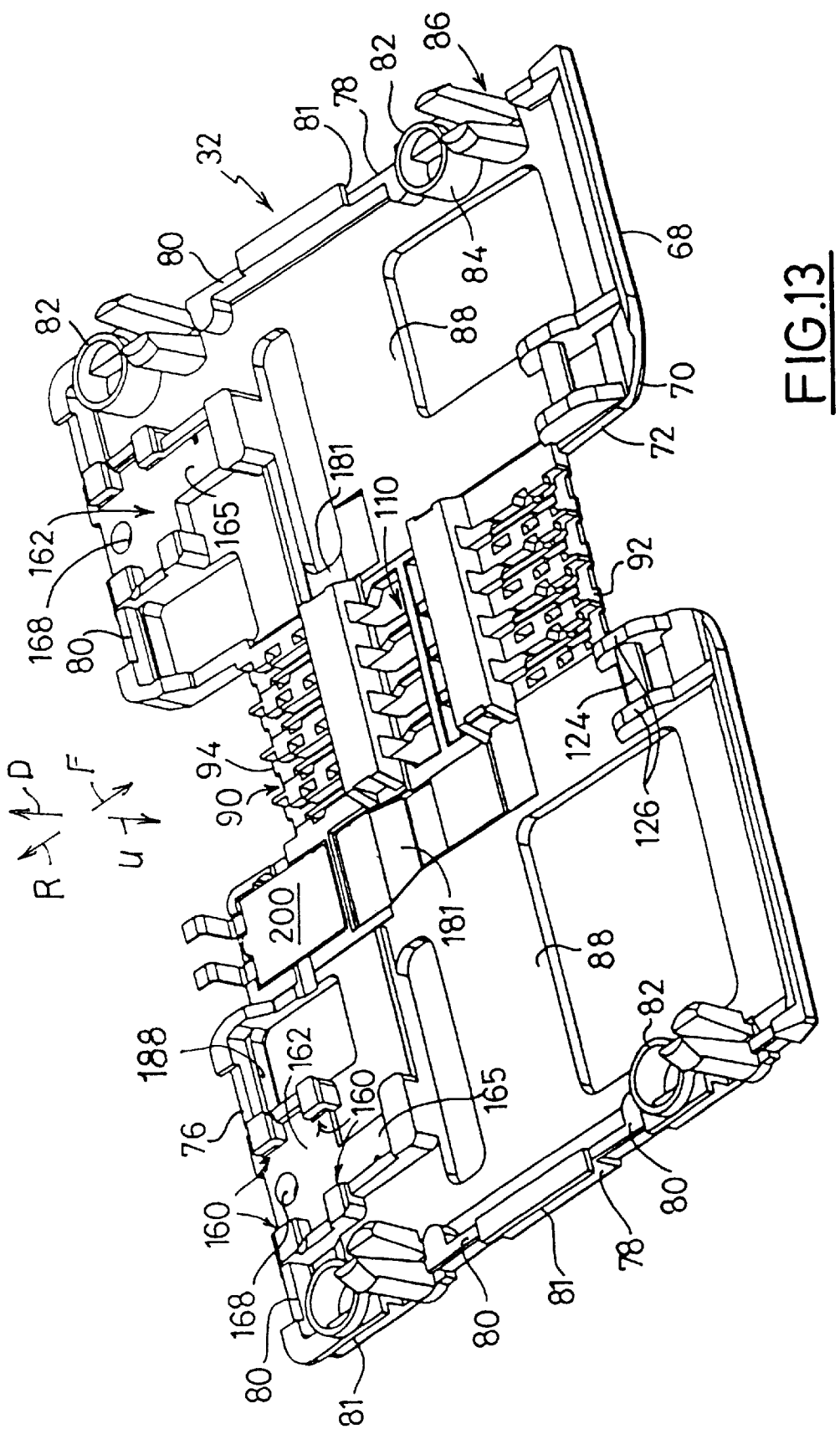
FIG. 13 is a bottom isometric view of the base of the connector of FIG. 2, and with an end-of-travel switch mounted thereon.

A base 32, as illustrated in FIG. 13, is taken as the reference element on which the assembly begins by fitting a switch 200 for detecting the presence of a card C in the inserted position. The switch actuator 202 may be seen in FIGS. 24 to 26. The tripping lever engages the front transverse edge 42 of the card according to a sequence such that, at the end of insertion of the card C into the connector, its transverse edge acts on the switch in order to guarantee its change of state approximately 0.8 mm before the card comes up against the stop, and conversely when removing the card.

The operations for assembling the various components continue with the mounting of the lever 112. For this purpose, as illustrated in FIG. 14, the bearings 118 are snapped around the pivot-pin sections 124 (FIG. 13) in order to mount the lever 112 so as to pivot about the axis X—X.

Figure 5:
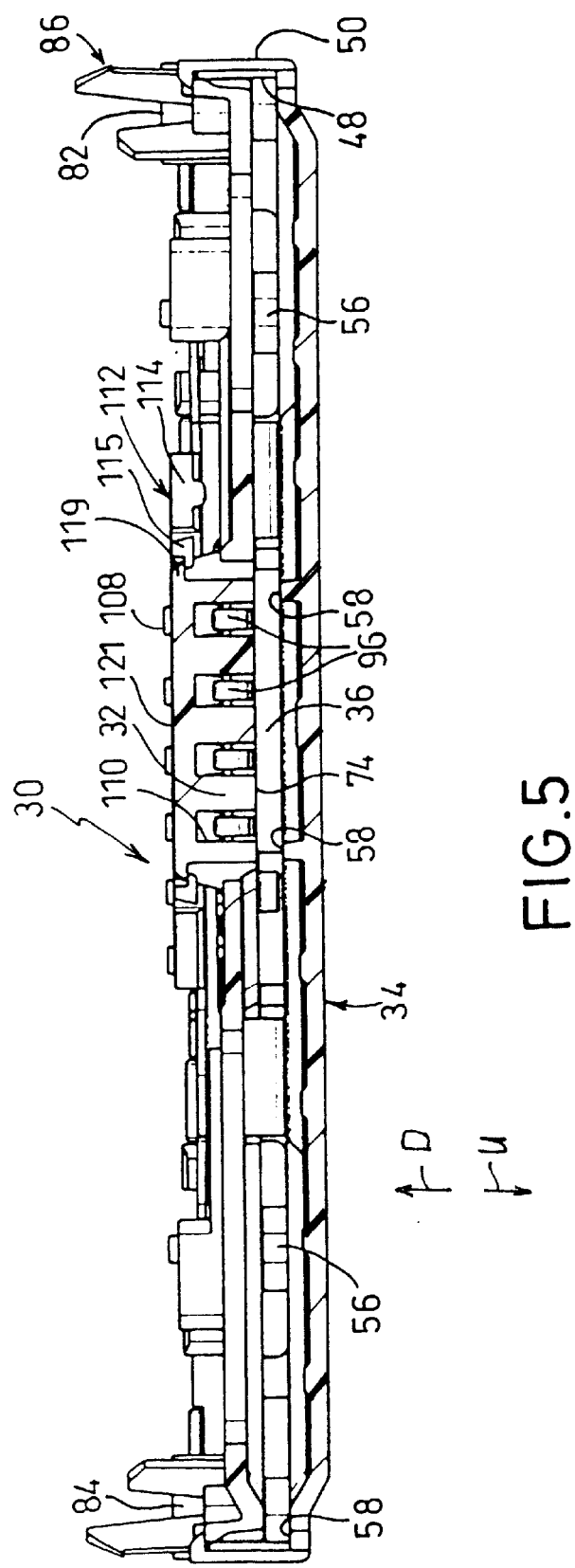
FIG. 5 is a sectional view taken on line 5—5 of FIG. 4.
Figure 14:
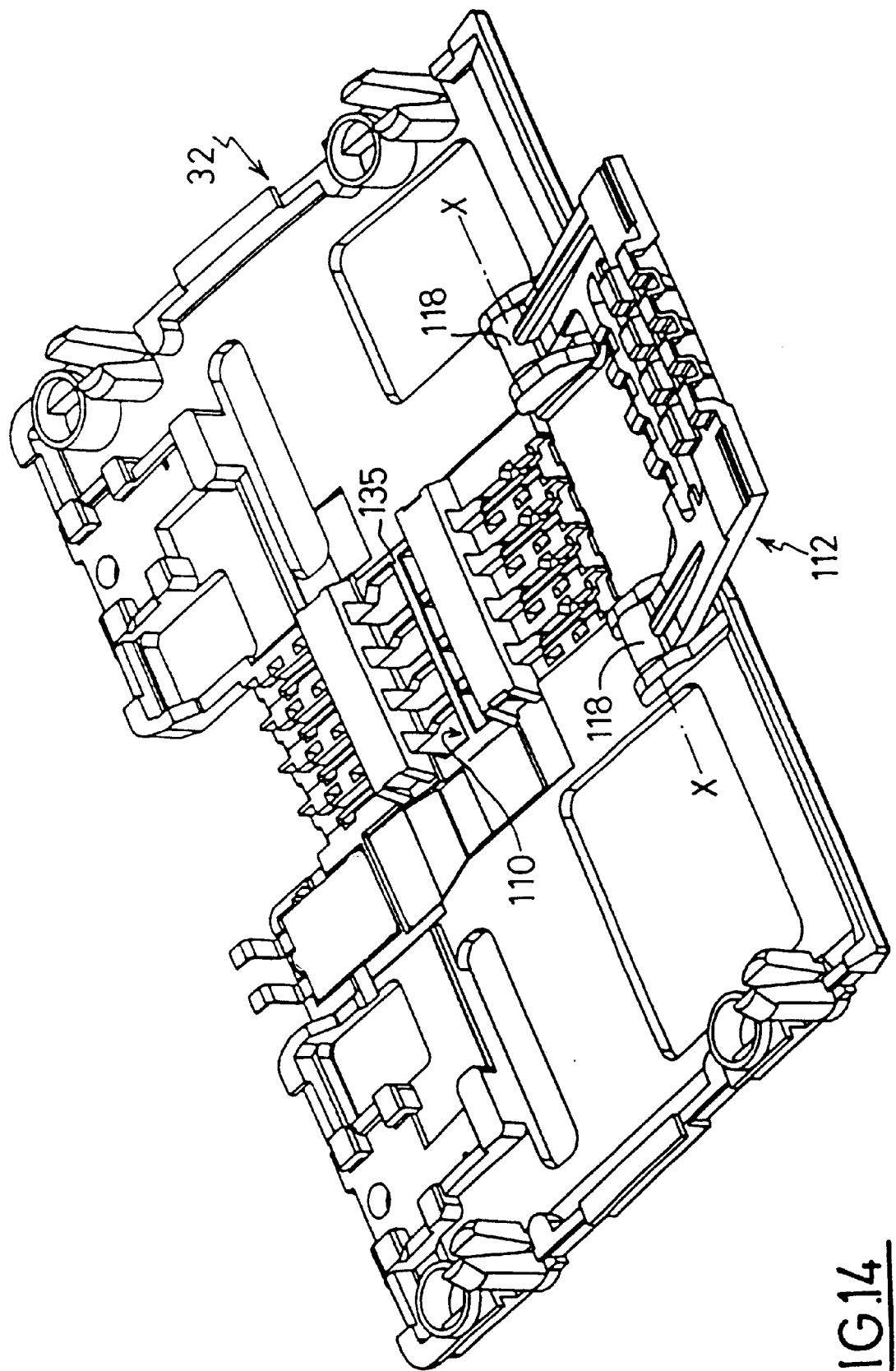
FIG. 14 is a view similar to that of FIG. 13, showing a first step in the installation of the lever onto the base.
Figure 15:
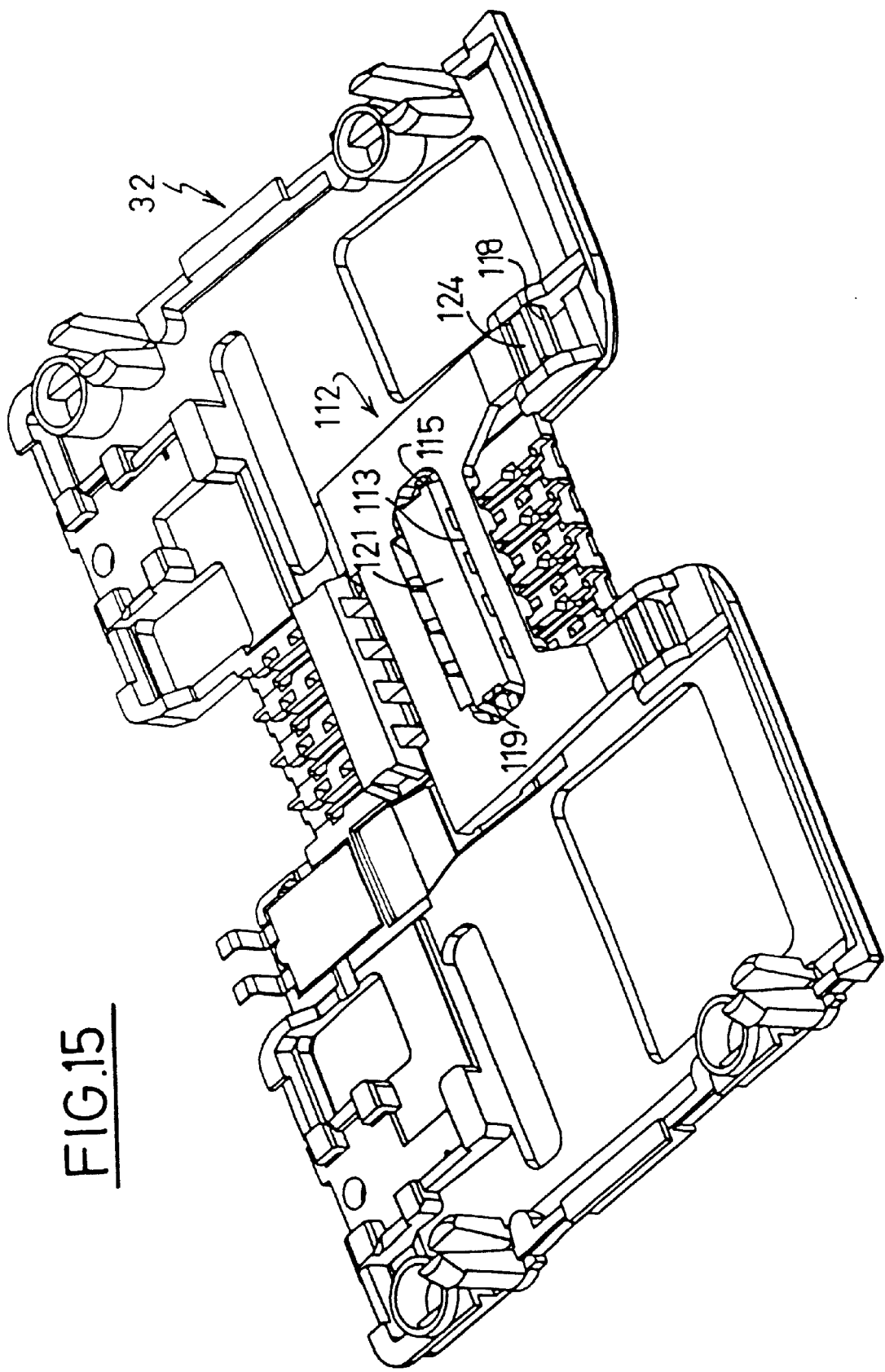
FIG. 15 is a view similar to that of FIG. 14, but with the lever fully installed on the base.
Figure 16:
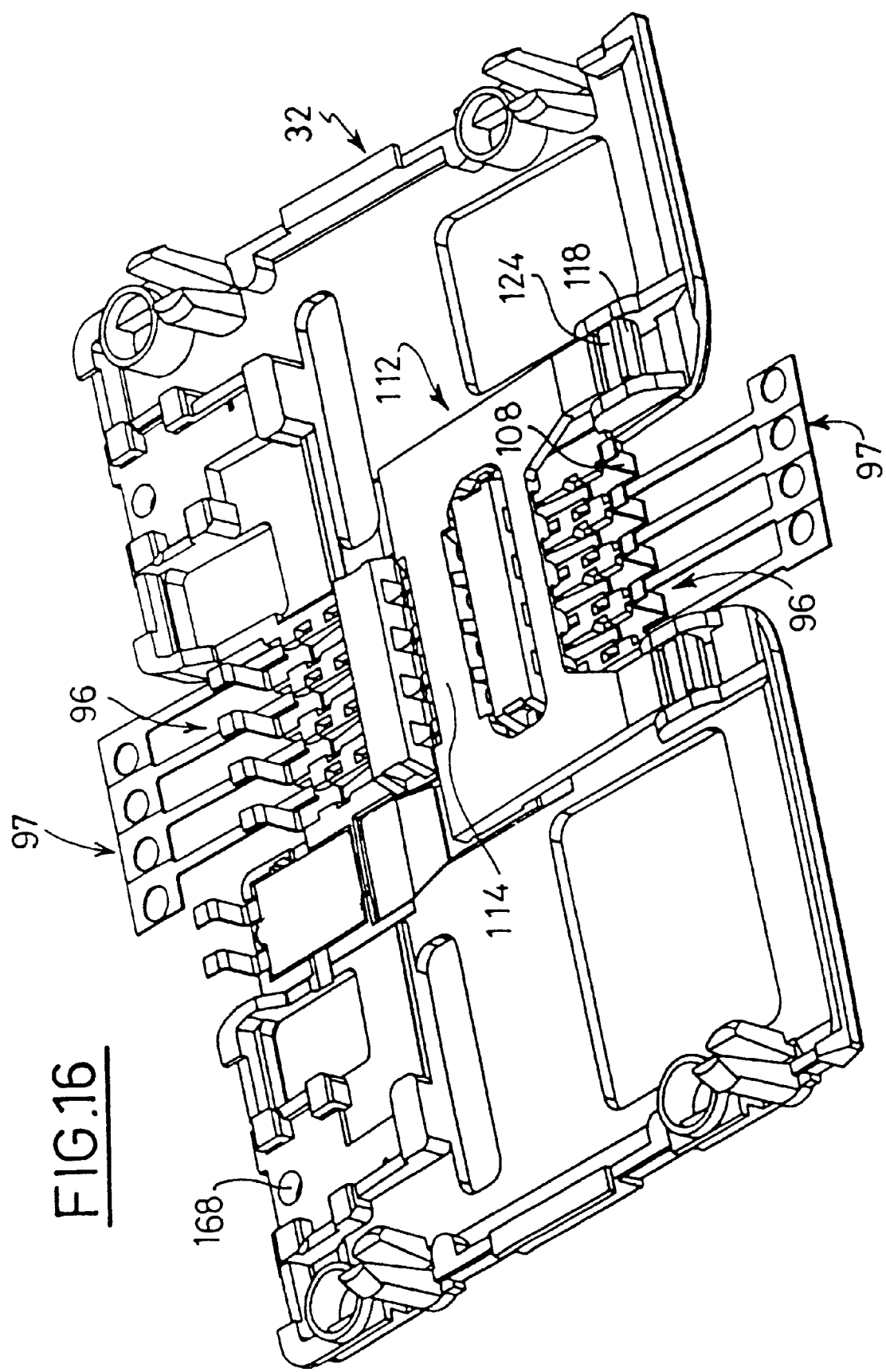
FIG. 16 is a view similar to that of FIG. 15, but showing a first step in the installation of electrical contacts on the base.

From the fitting position, illustrated in FIG. 14, the lever 112 is made to pivot until it reaches its position, illustrated in FIG. 15. In FIG. 15, that portion of the face 134 (FIG. 6) of the control bar 114 which lies between the two series of four receptacles 128, bears against the transverse member 135 (FIG. 14) of the base 32 lying between the cavities 110 (see FIG. 14). After having made the lever 112 pivot into its position illustrated in FIG. 15, its ability to pivot about the axis X—X (FIG. 14) is limited. This is because a central slot 113 in the lever has, at its opposite transverse ends, two retaining catches 115 which extend so as to face two stop lips 119 formed oppositely on part 121 (see FIGS. 5 and 15). The catches 115 elastically move away during mounting by virtue of the elastic deformation of the blade-shaped parts which support them.

Next, the two groups of four contacts 96 (FIG. 16) are introduced, by longitudinal M insertion in both directions. Each of the series of four blades are connected together by side pieces or carriers 97 in order to facilitate simultaneous insertion of the contacts in fours. During this insertion, the beak-shaped free ends 102 (FIG. 24) of the contacts 96 each enter a facing receptacle 128 (FIG. 6) in the control bar 114 of the lever 112 so as to extend opposite an upper partition 130 of the corresponding receptacle.

Figure 17:
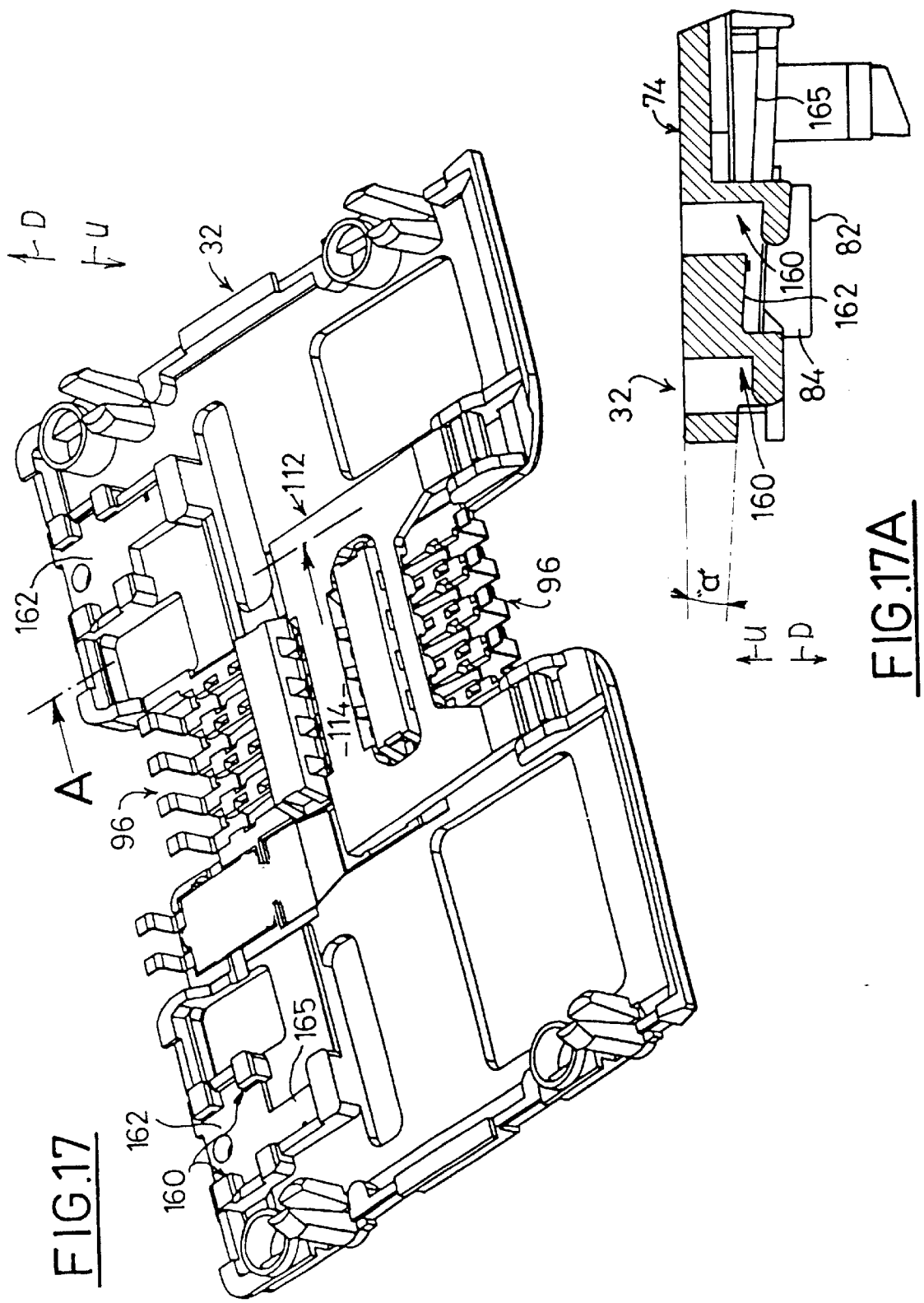
FIG. 17 is a view similar to that of FIG. 16, but with the contacts fully installed on the base and severed from their carriers.

After inserting the contacts 96, the side pieces 97 connecting the blades 96 are cut off, so as to end up with the arrangement illustrated in FIG. 17.

Figure 18:
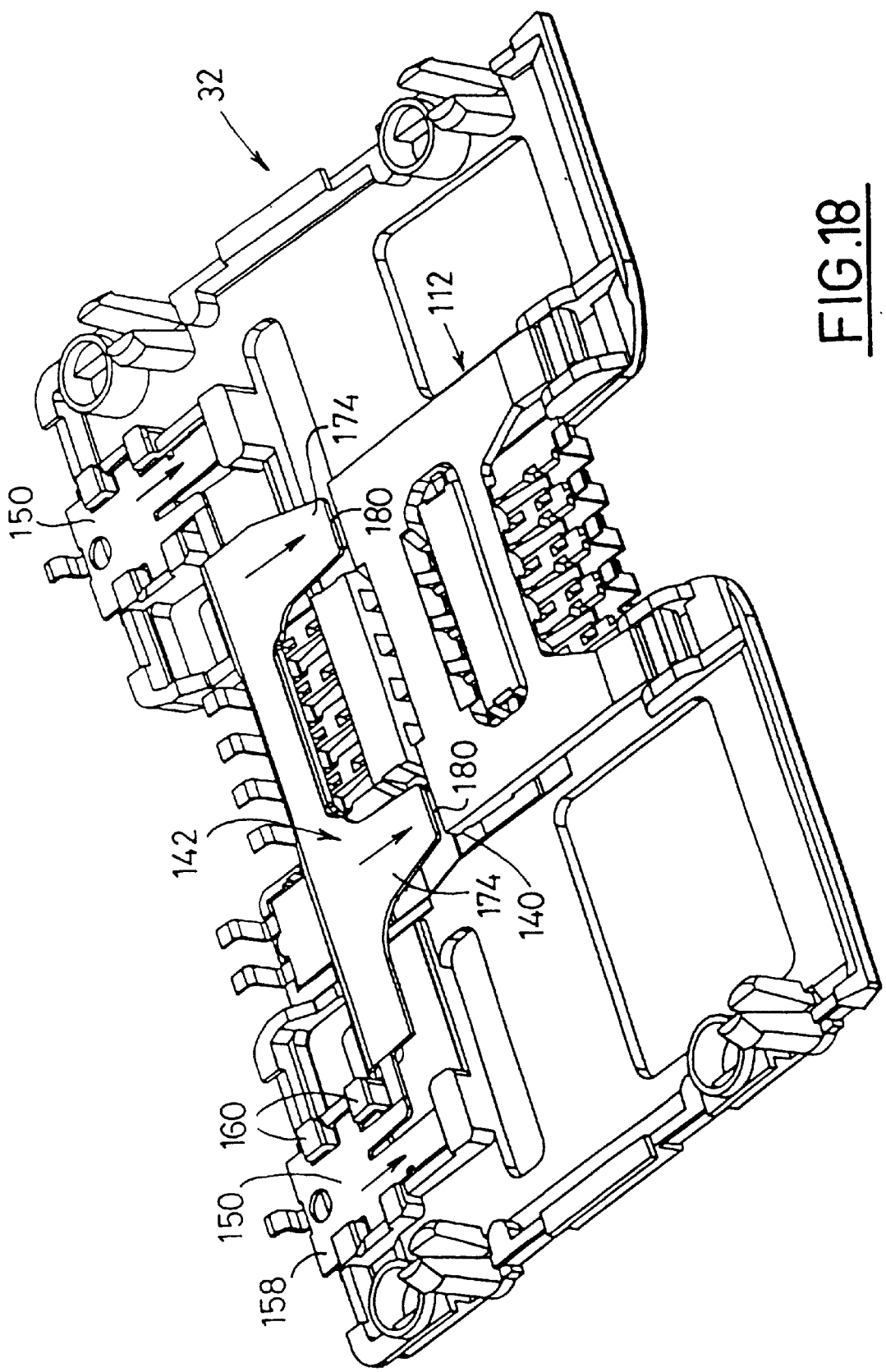
FIG. 18 is a view similar to that of FIG. 17, which shows a first step in the installation of the rocker on the base.

The next step, illustrated in two consecutive phases in FIGS. 18 and 19, consists in installing the rocker 142. To do this, as illustrated in FIG. 18, after having pushed the control bar 114 of lever 112 vertically downwards, the free ends 180 of the control bars of the rocker 142 are laid under the control surfaces 140. The fastening plates 150 are pressed down onto the bearing surfaces 162, in a downward vertical movement with regard to upside-down FIG. 18. Then the tabs 158 are inserted forwardly into the receptacles 160 in order to end up in the position illustrated in FIG. 19, in which the rocker 142 is fixed in place, with the plates 150 lying against surfaces 162 and with the front edges of the tabs 158 lying in the receptacles 160.

The force exerted on the control bar 114 (FIG. 18) of the lever 112 is then released. During this movement, the torsion bars 148 (FIG. 10) are twisted. This is due to the front longitudinal ends 180 of the control arms 174 being forced by the control surfaces 140 (FIG. 6) formed in the longitudinal ends of the longitudinal members of the lever 112.

The dimensions and shapes of the various components, and in particular the height of the plane in which the control arms 174 (FIG. 21) extend, are such that the lever 112 is forced to rotate counterclockwise about its pivot axis X—X. The contact blades 96 are resilient in order to occupy their so-called retracted position in which the control bar 114 of the lever 112 forces the beak-shaped ends 102 (FIG. 24) vertically downwards D (with respect to FIGS. 21 and 24) in order to deform the contact blades 96 elastically so that the curved contact ends 100 move away or retract from the upper face 74 of the contact-carrying base 32.

In this first equilibrium angular position of the rocker 142 and of the control bar 114, which is illustrated in particular in FIGS. 21 and 24, the contacts therefore do not project from the upper face 74, thereby leaving the latter entirely clear for inserting the card C.

Figure 20:
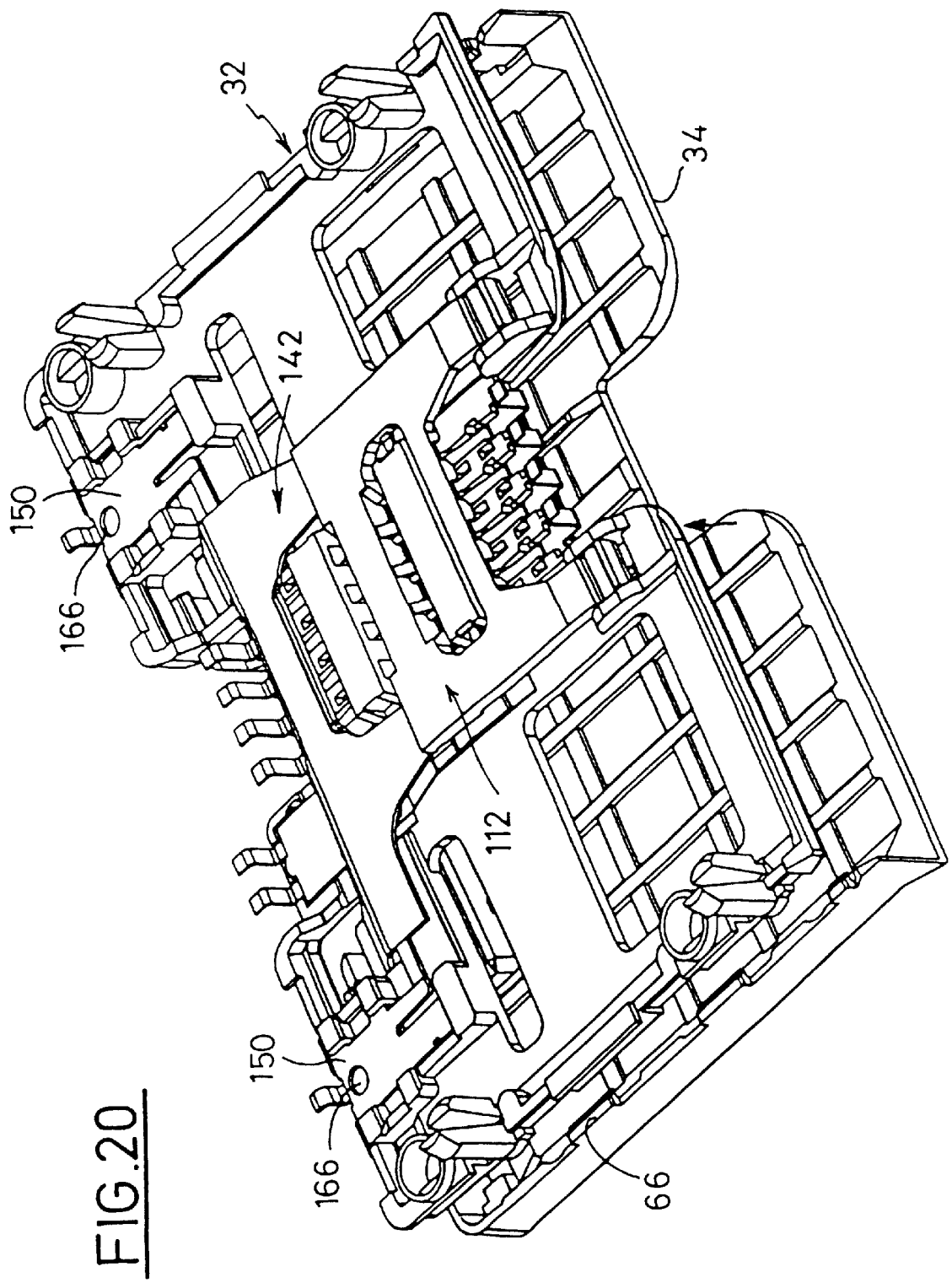
FIG. 20 is a view similar to that of FIG. 19, but showing how the cover is fitted onto the base.

Assembly of the components of the connector 30 is completed, as illustrated in FIG. 20, by fastening the cover 34 to the base 32 by the catches of the hooks 66 catching thereon.

During this fastening operation, by moving the cover 34 vertically downwards with respect to the base 32 (with regard to FIG. 20), the fingers or studs 170 pass in succession through the holes 168 in the base 32 and the aligned holes 166 in the plates 150 of the rocker 142, thus longitudinally immobilizing the plates 150 with respect to the base 32. During this operation, and so as subsequently to prevent the undesirable effect of the connector "opening" transversely to the outside, especially when inserting the card, provision may be made for the front part 35 of the side edges 50 of the lid 34 to fit complementarily into complimentary parts 33 on the base 32 (see FIG. 3).

The final operation of assembling the cover 34 is preferably carried out by crimping, using hot deformation, of the free ends of the fingers 170 which project vertically from the plates 150.

This crimping operation makes the assembly very rigid and reliably immobilizes the rocker 142, the plates 150 of which are "pinched" so as to bear vertically against the plane surfaces 162, which can then perform its functions under better conditions, i.e. with great geometrical precision and with control of the various forces.

It should be noted that the design of the connector is such that all the forces and stresses are confined to the same region, i.e. the region around the points where the fastening plates 150 are fitted. This arrangement is particularly advantageous since all the internal stresses, resulting in particular from the elastic action of the rocker 142 which is mounted prestressed, are confined to a very rigid region of the connector. Thus, the connector is not exposed to the risk of unwanted deformation during the heating operations for the purpose of fastening it and of connecting its leads using the so-called reflow technique which requires temperatures of about 260° C.

The fastening of the cover 34 to the base 32 was described in order to form a complete connector 30 constituting a whole unit.

Of course, it is possible beforehand to mount the subassembly illustrated in FIG. 19 on a printed-circuit board by carrying out the soldering or brazing operations necessary for the electrical connection of the contacts 96, of the end-of-travel switch 200 and of the tabs 196 of the rocker 142 and then to attach the plastic cover 34 subsequently, this mounting mode preventing, of course, the complementary operation of hot-crimping the fingers 170.

The operation of the control bar 114 and of the rocker 142 while the card C is being inserted into and removed from the connector 30 will now be described, with reference to FIGS. 21 to 26.

In FIGS. 21 and 24, the lever 112 with its control bar 114 is illustrated in its retracted position into which it is elastically returned by the rocker 142, in which position the ends 100 of the contacts 96 are retracted.

In this same position, the free ends 190 of the tabs 186 for actuating the rocker 142 project into the slot 36 near the rear end wall of the latter.

FIGS. 22, 23 and 25, 26 illustrate diagrammatically the longitudinal front-end part of a card C, the average thickness of which is bounded by its opposite main faces 38 and 40, the card C also having locally etched or embossed portions giving it an upper thickness bounded by surface portions 39 and 41.

The card C is inserted longitudinally from the front to the rear, i.e. from the right to the left with regard to FIGS. 21 to 26, and its front transverse edge 42 moves progressively into the slot 36 until it reaches the intermediate position, illustrated in FIGS. 22 and 25, in which it extends so as to be in line with the curved end portions 190 of the actuating tabs 186 of the rocker 142.

When the card C continues its insertion movement longitudinally to the left, beyond the intermediate position illustrated in FIGS. 22 and 25, the front transverse edge 42 engages simultaneously with the convex surfaces 192 of the curved ends 190 of the actuating tabs 186 in order to move them away through the holes 188 in the base 32.

This action by the edge 42 of the card C on the actuating tabs 186 causes the entire central part, and especially the transverse member 144, of the rocker 142 to rock about its axis of rotation Y—Y anticlockwise, with regard to FIGS. 21 to 26.

During the insertion movement of the card C, and as soon as its front edge 42 comes into contact with the actuating tabs 186, which then exert a bearing force on the opposite face of the card C, any electrostatic charges on the plastic card C are discharged to the earth circuit of the printed-circuit board of the read/write device to which these charges are transferred via the metal rocker 142 with its connection tabs 196, this being achieved before the contacts 96–100 come into electrical contact with the connection areas or pads on the card C.

The insertion movement of the card C and the rocking movement of the rocker 142 continue until the final insertion position illustrated in FIGS. 23 and 26 is reached.

The rotational movement of the rocker 142 towards its second angular position is performed in opposition to the springiness of the torsion bars 148, and the rotational return torque exerted by the torsional bars on the central part of the rocker increases proportionally.

The rocker 142 is then in its second angular position in which the free end of the control arms 174 no longer engages with the control surfaces 140 of the lever 112.

This second angular position is defined, in the limit, by the control arms coming into abutment with the stop surfaces 181.

As a result, the lever 112 can pivot freely about its axis X—X, clockwise with regard to FIGS. 21 to 26, due to the action of the elastic return force which is applied to the control bar 114 via the beak-shaped ends 102 which engage with the partitions 130.

The curved contact ends 100 are then free to come into contact, by landing vertically upwards, with the facing conducting areas formed on the lower face 38 of the card C.

The landing of the contacts 96–100 therefore takes place only right at the end of insertion travel of the card C in the connector 32, and very gradually, before the card acts on the switch 200.

By virtue of the design according to the invention, the position of the pivot axis X—X of the lever 112 which carries the bar 114 for controlling the contacts is such that, well to the front of the connector, the lever arm is very long and that, in the retracted position of the contacts, the deflection of the contacts is more or less the same for both rows of contacts.

When the card C is removed from the connector 30, and as soon as the edge 42 again reaches its longitudinal position illustrated in FIGS. 22 and 25, the rocker 142 pivots about the axis Y—Y clockwise, due to the effect of the return torque which is applied to it at the transverse member 144 by the torsion bars 148 so that the control arms 174 again act on the control surfaces 140 in order to make the lever 112 pivot anticlockwise about the axis X—X so that the control bar 114 again causes the contact ends 100 of the contact blades 96 to move away, this being accomplished after the card no longer acts on the switch 200.

Referring to the embodiment illustrated in FIG. 31, it may be seen that it is possible to shape the partitions 130 which engage with the beak-shaped ends 102 unsymmetrically so that, despite the longitudinal offset of two aligned partitions with respect to the pivot pin 124, the curved ends 100 of two aligned blades 96 are at the same height in the absence of a card, especially so as to prevent the curved ends of the right-hand blades, with regard to FIG. 31, from projecting slightly above the plane of the upper face 75.

For this purpose, the left-hand partition is thinned and shaped with a lower facet 131 which is inclined at an angle corresponding to the slope of the beak-shaped end 102 of the left-hand contact blade 96 furthest away from the pin 124, so that this facet serves as a bearing surface for the beak-shaped end 102 of the left-hand blade, while it is the free transverse edge 133 of the right-hand partition 130 which engages with the beak-shaped end 102 belonging to the left-hand contact blade 96 which is closest to the pin 124.

During removal, the action of the curved free ends 190 of the actuating tabs 186 on the transverse edge 42 of the card C provides an effect whereby the card C is partially ejected from the connector as soon as this edge gets passed the convex bend in the curved part 190.

In addition, the configuration of the rocker 142 and its arrangement in the connector provide the user with a tactile sensation both during insertion and removal of the card.

FIGS. 23 and 26 show the lever 112 pressed vertically, by the upper face of the control bar 114, against the facing lower face of the card C. The control bar 114 should normally "drop back" under gravity so as to bear vertically on the beak-shaped ends 102 of the contact blades 96. However, this arrangement may prove to be unsatisfactory if, due to the effect of spurious vibrations, the control bar applies a force to one or more contacts vertically until ending up with the corresponding blades lifting off from the connection areas on the card.

In order to remedy this drawback and so that the control bar occupies its state illustrated in FIGS. 23 and 26, in which it does not rest on the beak-shaped contact ends 102, the embodiment illustrated in FIGS. 27 to 29 may be used.

In this embodiment, each of the rear longitudinal ends 180' of the control arms 174' is shaped like a pitchfork, that is to say that it has a retaining tab 210 extending longitudinally in a plane parallel to that of the control arms 174', but in a plane vertically offset downwards so as to extend below a complementary retaining surface 212 formed in the lower face 132 of the control bar 114 near the rear free end of the longitudinal members 116.

Thus, the movements of the control bar and of the control arms are coupled in both directions.

Of course, if the connector is mounted the other way round with respect to the position illustrated in FIGS. 21 to 26, the face 132 of the control bar 114 assumes naturally, by gravity, its position illustrated in FIGS. 23 and 26.

The design according to the invention, apart from the advantages already mentioned, by using two simple components made from inexpensive materials, to produce a connector of the type with landing of the contacts by adding these two elements 112 and 142 beneath the lower face of a base, the design of which allows it to be used, without any change, for producing a sliding-contact connector, by combining it with the cover 34.

The difference in cost between the conventional version and the version with landing of the contacts is thus reduced because of the reduction in the number of pieces and because of a design which makes it very easy to automate the assembly.

If the base is not equipped with the elements 112 and 142, it may be necessary to use a brake for the card in the inserted position.

For this purpose, the embodiment illustrated in FIG. 30 may be used, in which two elastic strips 214 are produced by moulding in the upper face of the base in order to engage with the lower face of the card and to press the latter upwards in the cover 34.

The invention is not limited to the case in which the connector has two parallel rows of contacts, but may also be applied in the case of a connector having a single row of contacts.

What is claimed is:

1. Apparatus for connection to a smart card that has a card lower surface with contact pads thereon, comprising:

a housing that includes walls forming a card-receiving slot that lies in a horizontal plane and that has front and rear ends and laterally opposite sides, with said slot having a forwardly-opening front end for receiving the smart card by rearward sliding of the card along the slot;

a plurality of contacts having fastening parts fixed to said housing, pad-engaging parts having upper surfaces for engaging said smart card contact pads, and controlled contact parts that can move vertically to urge said pad-engaging parts upward and downward;

a rocker with a control portion that has laterally opposite ends and that is pivotally mounted on said housing about a laterally-extending first axis, said control portion having a rear part lying in a rear portion of said slot to be deflected downward and primarily out of said slot by said card, and said control portion being coupled to said controlled contact parts to at least release said pad-engaging parts to move upward.

2. The apparatus described in claim 1 wherein:

said controlled contact parts bias said rocker control portion to pivot toward a position wherein said rear part of said control portion lies in said card-receiving slot.

3. The apparatus described in claim 1 wherein:

said rocker control portion has a front part that moves up when said rear part is deflected down; and including a lever that is pivotally mounted on said housing about a laterally-extending second axis that lies forward of said first axis, with said lever having a rear end that is engaged with said controlled contact parts and that is engaged with said control portion front part, with said lever coupling said control portion to said controlled contact parts.

4. The apparatus described in claim 3 wherein:

said rocker is formed from a single piece of sheet metal, while said lever which engages said controlled contact parts is molded of dielectric plastic material.

5. The apparatus described in claim 1 wherein:

said rocker has fastening parts fixed to said housing and has deflect portions that pivotally connect said control portion to said fastening parts.

said deflect portions each includes a torsion bar that can be twisted substantially about said first axis.

6. The apparatus described in claim 5 wherein:

said deflect portions each includes a beam extending in forward and rearward directions and having an end merging with one of said fastener parts and an opposite end merging with one of said torsion bars.

7. Apparatus for connecting to a smart card that has a card surface with contact pads thereon, comprising:

a housing (224) that has slot walls forming a card-receiving slot (36) into which said smart card can be rearwardly inserted to a fully inserted position, with said slot having a center plane and having a slot rear end portion;

a plurality of contacts having mount parts (104) that are mounted on said housing, pad-engaging parts (100) for engaging said contacts pads, and controlled contact parts (102);

a lever (112) that is pivotally mounted (x—x) on said housing and that is engaged with said controlled contact parts, said lever being pivotal from a retract position wherein said lever deflects said controlled contact parts to move said pad-engaging contact parts at least partially our of said slot, and a release position wherein said lever releases said controlled contact parts to allow said pad-engaging contact parts to move into said slot;

a rocker (142) with a control portion (144) that is pivotally mounted about a rocker axis (Y—Y) with respect to said housing, to pivot between a retracted position and a released position, said control portion having a rear end (190) which, in the retracted position, extends into said slot rear end portion to be deflected primarily out of the slot as the smart card reaches said fully installed position, said control portion having at least one control arm (174) that is positioned to allow said lever to pivot to said release position when said control portion rear end is deflected out of the slot to said released position, with said control portion being biased toward said retracted position wherein said rear end extends into said slot;

said rocker is formed of a single piece of sheet metal, and has a fastening part (150) that is fixed to said housing, and said rocker has a deflectable portion (240) that allows said control portion to pivot between said retracted and released positions.

8. The apparatus described in claim 7 wherein:

said deflectable portion of said rocker biases said control portion to pivot toward said retracted position while allowing said control portion to pivot to said release position against said bias.

9. The apparatus described in claim 7 wherein:

said rocker axis extends in a predetermined lateral direction and said control portion has a pair of laterally-spaced ends;

said fastening part includes a pair of laterally-spaced fastening plates (150) that are each fixed to said housing;

said deflectable portion includes a pair of deflectable parts that each connect one of said fastening plates to one of said ends of said control portion, with each deflectable portion including a torsion bar that can be twisted substantially about said rocker axis.

said rocker includes a single integral element that includes said fastener plates, said pair of deflectable parts that connect said fasteners to said ends of said control portions, and said control portion.

10. The apparatus described in claim 7 wherein:

said card-receiving slot extends horizontally and said lever and said control arms both lie under said slot;

said lever has a front end that is pivotally mounted on said housing and has a rear end that can move up and down;

said rocker control portion lies over said lever rear end in sliding contact with said lever rear end.

11. The apparatus described in claim 7 wherein:

said control portion has a pair of laterally-spaced actuator tabs (180) forming said control portion rear end, and said at least one control arm includes a pair of laterally-spaced control arms (174).

12. The apparatus described in claim 7 wherein:

said slot is open in a forward direction to receive a card that is slid rearwardly into said slot;

said lever is pivotally mounted about a laterally-extending lever axis (X—X) that extends perpendicular to forward and rearward directions;

said rocker axis extends parallel to said lever axis and lies rearward of said lever axis, with said control arm extending forward of said rocker axis and with said lever having a control bar (114) that engages said controlled contact parts and that engages said control arm, with said control bar extending rearwardly from said lever axis.

13. The apparatus described in claim 7 including:

a circuit board, with said housing lying on said circuit board and with said circuit board having a conductive trace;

said rocker has a solder tail extending from said fastening part and soldered to said trace on said circuit board.

14. Apparatus for mounting on a circuit board that has conductive traces and for connecting said traces to contact pads of a smart card that has a card lower surface with said contact pads thereon, comprising:

a housing that is mounted on said circuit board, said housing including walls forming a slot that lies in a primarily horizontal plane and that has front and rear ends and laterally opposite sides, with said slot having a forwardly-opening front end for receiving the smart card by rearward sliding of the card along the slot;

a plurality of contacts having fastening parts fixed to said housing, pad-engaging parts having upper surfaces for engaging said smart card contact pads and controlled contact parts that can be moved vertically to move said pad-engaging parts upward in said slot and downward;

a lever that has a front end pivotally mounted on said housing about a laterally-extending lever axis with said lever having a rear end that includes a control bar that engages said controlled contact parts to move them vertically away from said slot;

a rocker with a laterally extending control portion that is pivotally mounted on said housing about a laterally-extending rocker axis, with said control portion having a card-engaging tab extending at an upward and rearward incline into said slot to be depressed by said card as said card becomes fully inserted, and with said control portion having a forwardly-extending control arm that has a front end that is engaged with said rear end of said lever.

* * * * *